(12) United States Patent
Yabuuchi et al.

(10) Patent No.: US 8,508,491 B2
(45) Date of Patent: Aug. 13, 2013

(54) INFORMATION INPUT DEVICE, IMAGE FORMING APPARATUS, POSITION DETERMINATION METHOD, AND POSITION DETERMINATION PROGRAM

(75) Inventors: Masayuki Yabuuchi, Kanagawa (JP); Eiji Enami, Kanagawa (JP); Junji Matsuzawa, Kanagawa (JP); Kensuke Nagumo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 691 days.

(21) Appl. No.: 12/718,499

(22) Filed: Mar. 5, 2010

(65) Prior Publication Data
US 2010/0231553 A1    Sep. 16, 2010

(30) Foreign Application Priority Data

Mar. 16, 2009  (JP) .................................. 2009-063406
Jan. 15, 2010  (JP) .................................. 2010-007242

(51) Int. Cl.
*G06F 3/041* (2006.01)
(52) U.S. Cl.
USPC ......... 345/173; 345/174; 345/179; 178/18.06
(58) Field of Classification Search
USPC ........... 345/173–174, 179; 178/18.01–18.03, 178/18.05–18.08, 19.01, 19.03, 19.04; 463/37
See application file for complete search history.

(56) References Cited

U.S. PATENT DOCUMENTS

| | | | |
|---|---|---|---|
| 2003/0067451 A1* | 4/2003 | Tagg et al. | 345/174 |
| 2007/0057961 A1 | 3/2007 | Enami et al. | |
| 2007/0063707 A1* | 3/2007 | Van Berkel | 324/457 |
| 2007/0229469 A1* | 10/2007 | Seguine | 345/173 |
| 2009/0167725 A1* | 7/2009 | Lee et al. | 345/178 |
| 2010/0263944 A1* | 10/2010 | Lin et al. | 178/18.06 |
| 2011/0007029 A1* | 1/2011 | Ben-David | 345/174 |
| 2011/0127092 A1* | 6/2011 | Lu | 178/18.06 |
| 2011/0141040 A1* | 6/2011 | Kang et al. | 345/173 |
| 2012/0218224 A1* | 8/2012 | Lin et al. | 345/174 |

FOREIGN PATENT DOCUMENTS

| | | |
|---|---|---|
| JP | 11-161425 | 6/1999 |
| JP | 2002-182835 | 6/2002 |
| JP | 2003-263274 | 9/2003 |

* cited by examiner

*Primary Examiner* — Lun-Yi Lao
*Assistant Examiner* — Kelly B Hegarty
(74) *Attorney, Agent, or Firm* — Oblon, Spivak, McClelland, Maier & Neustadt, L.L.P.

(57) ABSTRACT

Disclosed is an information input device including a touch panel in which a display screen for displaying operations information is integrated with a sensor unit and to which the operations information is input when the display screen is touched with a predetermined unit, the sensor unit having plural sensors, which are capable of measuring a capacitance at a front surface of the display screen, arranged in a staggered manner such that three of the plural sensors adjacent to each other are arranged at positions corresponding to apices of a regular triangle; and a position determination unit that determines a position touched with the predetermined unit on the display screen in accordance with levels of the capacitances detected with the three adjacent sensors in a region of the regular triangle formed by the three adjacent sensors among the plural sensors constituting the sensor unit.

12 Claims, 19 Drawing Sheets

| SCREEN ID | COMPONENT IMAGE ID | POSITION INFORMATION | OPERATIONS INFORMATION |
|---|---|---|---|
| 001 | 001 | $X_{a11}, Y_{a11} - X_{b11}, Y_{b11}$ | 1 |
| 001 | 002 | $X_{a12}, Y_{a12} - X_{b12}, Y_{b12}$ | 2 |
| 001 | 003 | $X_{a13}, Y_{a13} - X_{b13}, Y_{b13}$ | 3 |
| 002 | 001 | $X_{a21}, Y_{a21} - X_{b21}, Y_{b21}$ | a |
| ... | | | |

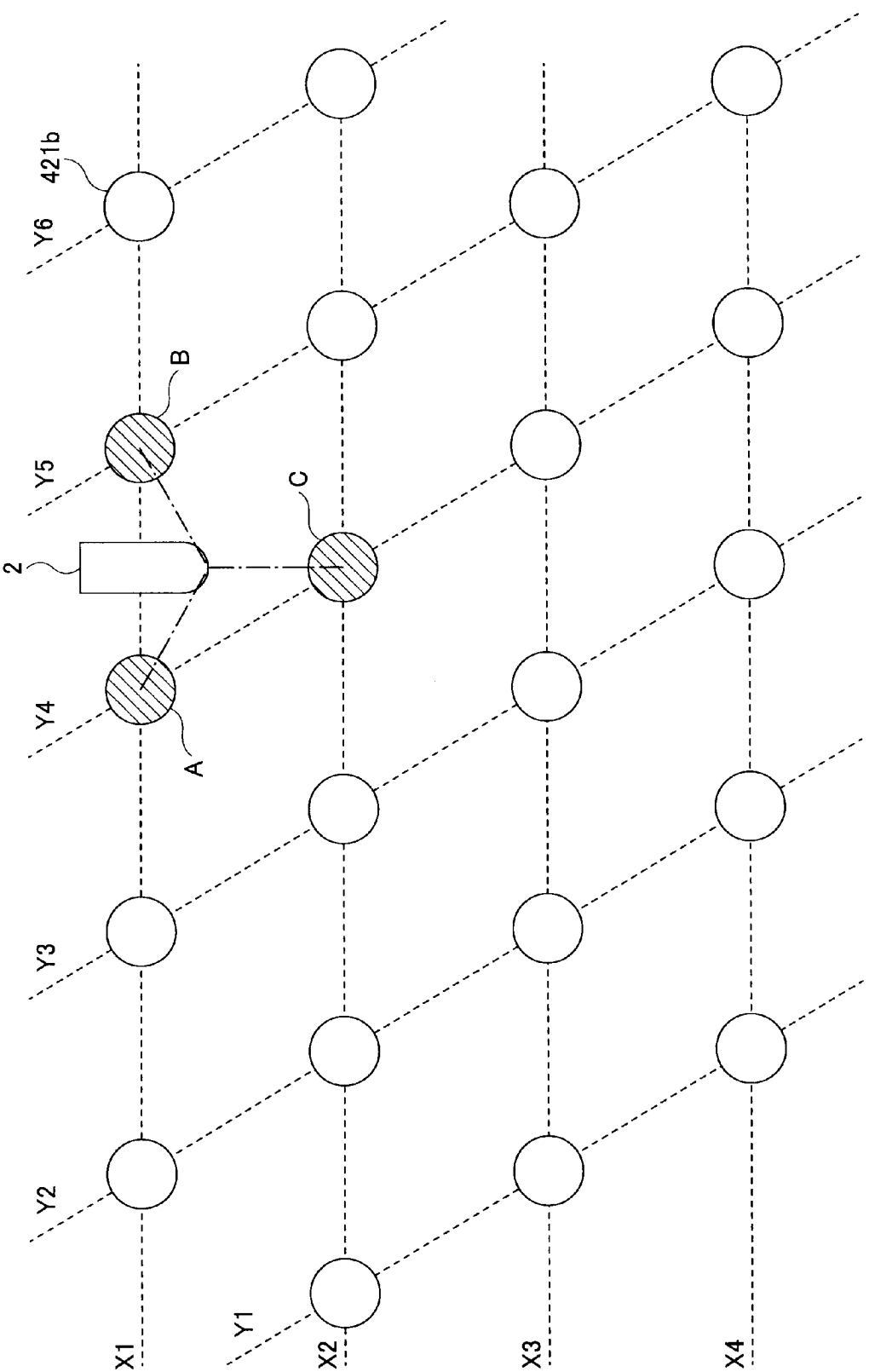

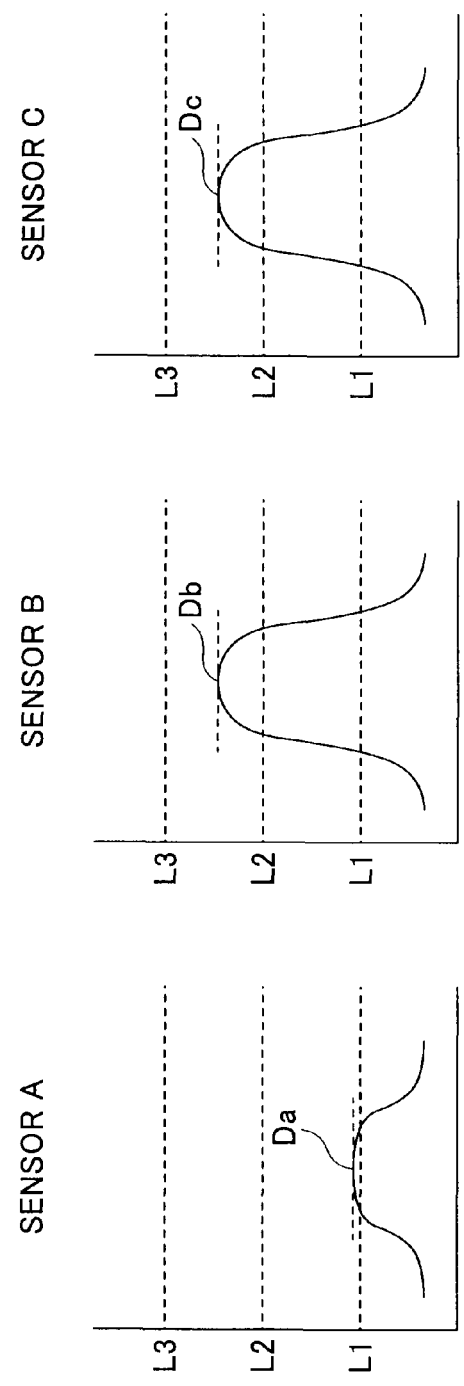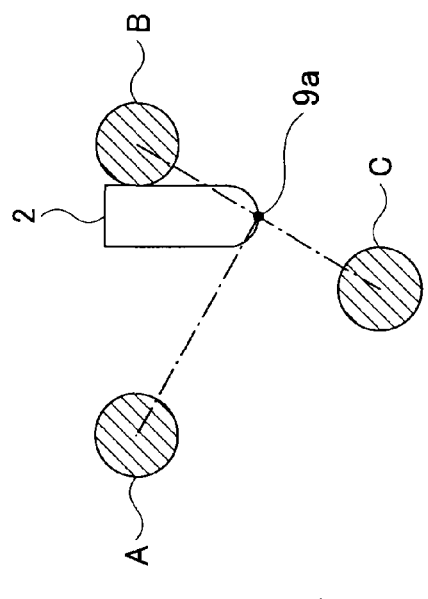
FIG.13A
FIG.13B

INFORMATION INPUT DEVICE, IMAGE FORMING APPARATUS, POSITION DETERMINATION METHOD, AND POSITION DETERMINATION PROGRAM

BACKGROUND OF THE INVENTION

1. Field of the Invention

The present invention relates to an information input device, an image forming apparatus, a position determination method, and a position determination program. Particularly, the present invention relates to the input of operations information to an image forming mechanism.

2. Description of the Related Art

In recent years and continuing to the present, the digitization of information has become pervasive. Therefore, image processing apparatuses such as printers and facsimile machines used for outputting digitized information and scanners used for digitizing documents are indispensable. In many cases, such image processing apparatuses are configured as multi-function peripherals that can serve as printers, facsimile machines, scanners, and copiers because they have an image pickup function, an image forming function, a communication function, etc.

Such image processing apparatuses are provided with an operations unit for inputting information corresponding to the various functions described above. Generally, the operations unit serving as a switching unit, which is used for switching the mechanisms of the printer, facsimile machine, scanner, copier, etc., uses a tact key system.

However, since the image processing apparatuses have gone multifunctional in recent years, they should have many operational functions installed therein. Therefore, the number of tact keys to be provided increases, which in turn makes it difficult for users to operate the image processing apparatuses. In addition, a space for arranging the tact keys is limited in the image processing apparatuses. On the other hand, if the limited number of tact keys are used for implementing all the operations, many operations are allocated to each of the tact keys, which in turn also makes it difficult for the users to operate the image processing apparatuses.

Meanwhile, as another mode of the operations unit, a touch panel may be used. In the touch panel, a display screen for displaying information is integrated with an operations unit serving as an input unit for inputting information, and users input information by touching the display screen of the touch panel with a finger, a dedicated pen, etc. When the users switch the display of the display screen, various screens serving as an input screen for inputting information can be realized on the touch panel.

In such a touch panel, various information input units are configured on a limited display screen. Therefore, there is disclosed an example in which multiple switches, which serve as sensors and are turned on by the contact of a finger or a dedicated pen, are arranged in a lattice pattern. In this example, information corresponding to each screen is input when a display screen is switched (see, e.g., Patent Document 1).

Thus, in the touch panel, various screens serving as input screens for inputting information can be implemented in such a manner that the display of the display screen is switched. Therefore, when the switching unit is configured by the touch panel, problems in operationality and an installation space can be addressed.

However, according to the touch panel using the method disclosed in Patent Document 1, a touched position is detected based on the arrangement positions of the switches serving as sensors. Therefore, in case that a position between the switches is touched, the touched position cannot be accurately detected. In other words, if an area surrounded by four sensors rather than the upper parts of the sensors is touched by a finger or a dedicated pen, it is not possible to determine which one of the sensors is touched. In order to improve accuracy in detecting a touched position, an arrangement interval between the sensors must be finely adjusted. In this case, however, the number of sensors increases, which in turn increases a manufacturing cost.

Such a problem is not limited to a case where the switching unit is configured by the touch panel, but it could also be caused in a touch panel applied to the main operations screen of an image processing apparatus. Further, such a problem could also be caused not only in the operations unit of the image processing apparatus but also in portable information processing apparatuses such as mobile phones and PDAs (Personal Data Assistants) that have an information input device integrated with a display screen.

Patent Document 1: JP-A-2002-182835

SUMMARY OF THE INVENTION

The present invention has been made in light of the above circumstances and has an object of improving accuracy in detecting a touched position without increasing the number of sensors in an information input device integrated with a display screen.

According to one aspect of the present invention, there is provided an information input device including a touch panel in which a display screen for displaying operations information is integrated with a sensor unit and to which the operations information is input when the display screen is touched with a predetermined unit. The sensor unit has plural sensors, which are capable of measuring a capacitance at a front surface of the display screen, arranged in a staggered manner such that three of the plural sensors adjacent to each other are arranged at positions corresponding to apices of a regular triangle. In addition, the information input device includes a position determination unit that determines a position touched with the predetermined unit on the display screen in accordance with levels of the capacitances detected with the three adjacent sensors in a region of the regular triangle formed by the three adjacent sensors among the plural sensors constituting the sensor unit.

According to another aspect of the present invention, there is provided a position determination method in which a computer determines an operated position on a touch panel in an information input device having the computer to which operations information is input through operations on the touch panel. The information input device includes a display screen for displaying operations information integrated with a sensor unit in the touch panel. The sensor unit has plural sensors capable of measuring a capacitance at a front surface of the display screen arranged in a staggered manner such that three of the plural sensors adjacent to each other are arranged at positions corresponding to apices of a regular triangle. The computer executes an input determination step of determining that the display screen is touched and the operations information is input when detecting the sensor that detects a level of the capacitance greater than or equal to a threshold; a threshold comparison step of comparing the levels of the capacitances detected with the adjacent sensors with the threshold relative to the one sensor that detects the level of the capacitance greater than or equal to the threshold; and a position determination step of determining the touched position on the display screen in accordance with the level of the capacitance detected with the one sensor and the levels of the capacitances detected with the two adjacent sensors based on a comparison result in the threshold comparison step.

According to an embodiment of the present invention, an information input device has a display screen for displaying information integrated with a sensor unit having plural sensors arranged at the front surface of the display screen. The information is input to the information input device when the display screen is touched. With this configuration, it is possible to improve accuracy in detecting a touched position without increasing the number of the sensors.

Other objects, features and advantages of the present invention will become more apparent from the following detailed description when read in conjunction with the accompanying drawings.

BRIEF DESCRIPTION OF THE DRAWINGS

FIG. 5 is a diagram showing an example of operating position corresponding information stored in an operations information processing unit according to the embodiment of the present invention;

FIG. 8 is a top view showing the arrangement of the sensors according to the embodiment of the present invention;

FIGS. 13A and 13B are diagrams showing the positional relationship between the sensors and the electrostatic substance and the detection signals of the sensors according to the embodiment of the present invention;

DETAILED DESCRIPTION OF THE PREFERRED EMBODIMENTS

Next, an embodiment of the present invention is described in detail with reference to the accompanying drawings. This embodiment exemplifies an image forming apparatus having an information input device integrated with a display screen as an information input device.

Figure 1:
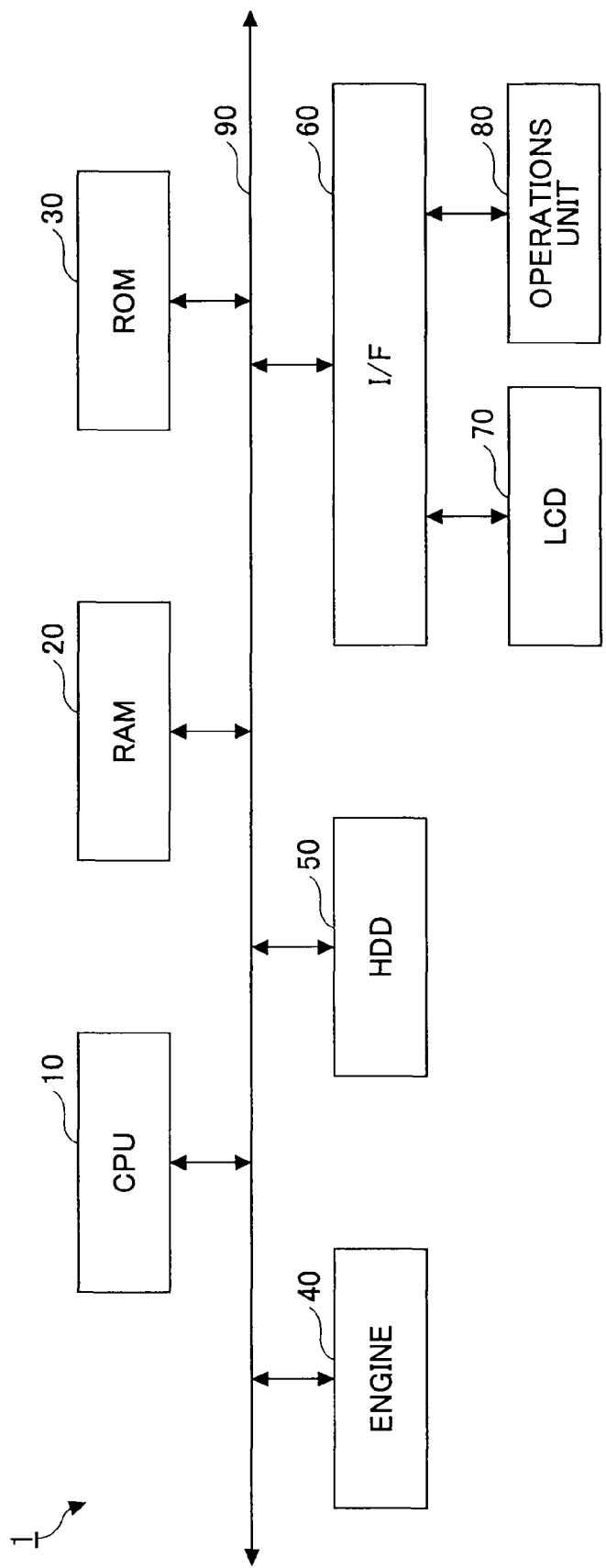
FIG. 1 is a block diagram showing the hardware configuration of an image forming apparatus 1 according to an embodiment of the present invention.

FIG. 1 is a block diagram showing the hardware configuration of an image forming apparatus 1 according to the embodiment. As shown in FIG. 1, the image forming apparatus 1 according to the embodiment has an engine for executing image formation in addition to the configuration of an information processing terminal such as a general server and a PC (Personal Computer). In other words, the image forming apparatus 1 according to the embodiment has a CPU (Central Processing Unit) 10, a RAM (Random Access Memory) 20, a ROM (Read Only Memory) 30, the engine 40, a HDD (Hard Disk Drive) 50, and an I/F 60, all of which are connected to one another through a bus 90. Further, the I/F 60 is connected to a LCD (Liquid Crystal Display) 70 and an operations unit 80.

The CPU 10 is a calculation unit and controls the entire operations of the image forming apparatus 1. The RAM 20 is a volatile storage medium from/in which information can be read/written at high speed and used as a work area when the CPU 10 processes information. The ROM 30 is a non-volatile storage medium used for reading only and has programs such as firmware stored therein. The engine 40 is a mechanism that actually executes image formation in the image forming apparatus 1.

The HDD 50 is a non-volatile storage medium from/in which information can be read/written, and it has an OS (Operating System), various control programs, application programs, etc., stored therein. The I/F 60 connects the bus 90 to various hardware devices, networks, etc., and controls them. The LCD 70 is a visual user interface that allows the user to confirm the status of the image forming apparatus 1. The operations unit 80 is a user interface such as a keyboard and a mouse that allows the user to input information to the image forming apparatus 1. Particularly, in the embodiment, the LCD 70 is integrated with the operations unit 80.

A software control unit is configured to operate in such a manner that the programs stored in the ROM 30, the HDD 50, or a storage medium such as an optical disk, not shown, are read in the RAM 20 and operated in accordance with the control of the CPU 10. With the combination of the software control unit and the hardware devices, a functional block that implements the functions of the image forming apparatus 1 according to the embodiment is configured.

Figure 2:
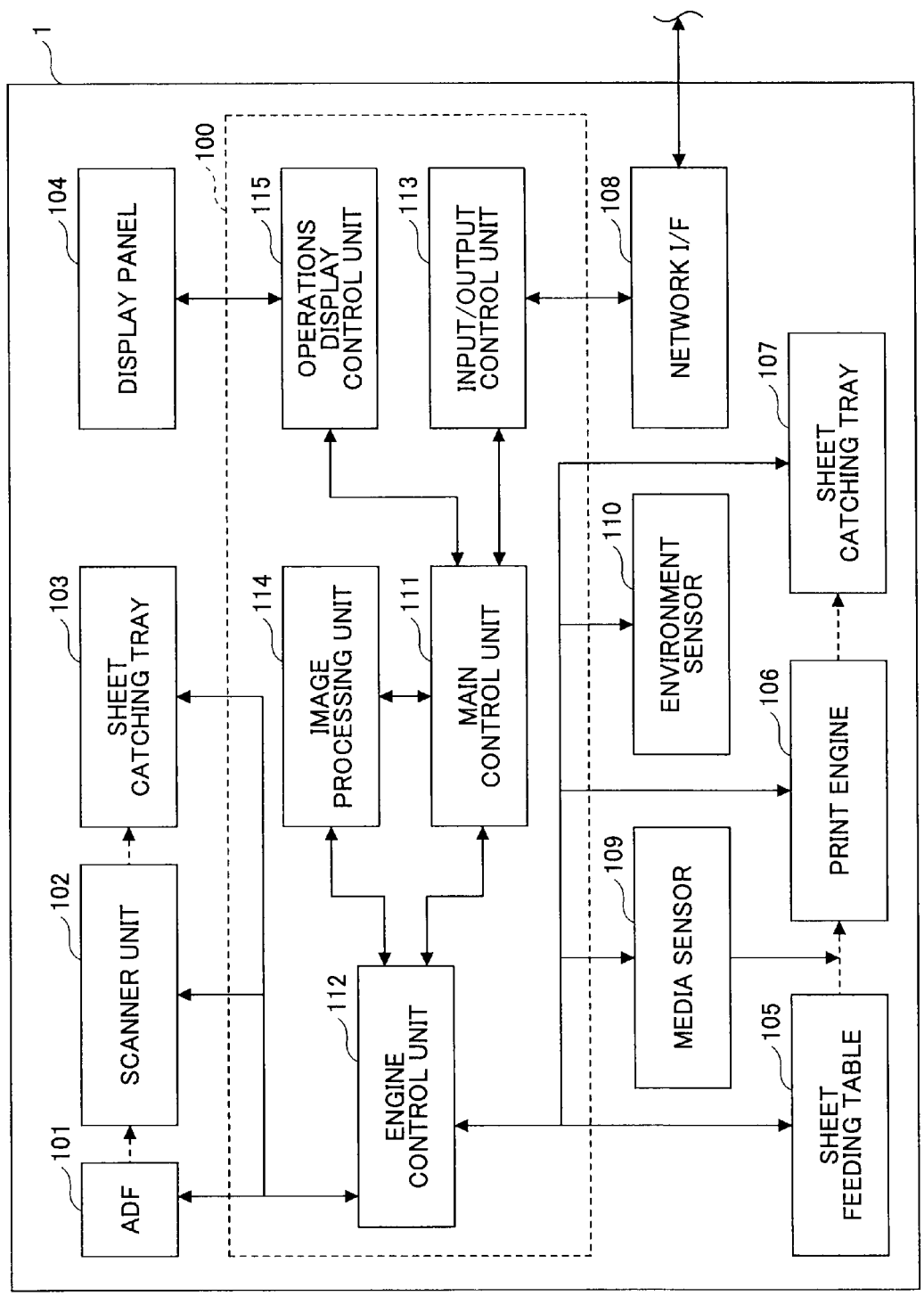
FIG. 2 is a block diagram showing the functional configuration of the image forming apparatus according to the embodiment of the present invention.

Next, the functional configuration of the image forming apparatus 1 according to the embodiment is described with reference to FIG. 2. FIG. 2 is a block diagram showing the functional configuration of the image forming apparatus 1 according to the embodiment. As shown in FIG. 2, the image forming apparatus 1 according to the embodiment has a controller 100, an ADF (Auto Document Feeder) 101, a scanner unit 102, a sheet catching tray 103, a display panel 104, a sheet feeding table 105, a print engine 106, a sheet catching tray 107, and a network I/F 108.

Further, the controller 100 has a main control unit 111, an engine control unit 112, an input/output control unit 113, an image processing unit 114, and an operations display control unit 115. As shown in FIG. 2, the image forming apparatus 1 according to the embodiment is configured as a multi-function peripheral having the scanner unit 102 and the print engine 106. Note that in FIG. 2, electrical connections are indicated by arrows of solid lines, and the flows of sheets are indicated by arrows of dotted lines.

The display panel 104 serves not only as an output interface for visually displaying the status of the image forming apparatus 1 but also as an input interface (operations unit) that the user uses as a touch panel to directly operate the image forming apparatus 1 or input information to the image forming apparatus 1. As described above, the display panel 104 is configured by the LCD 70 and the operations unit 80 shown in FIG. 1.

The network I/F 108 is an interface for allowing the image forming apparatus 1 to communicate with other equipment via a network. An Ethernet™ and a USB (Universal Serial Bus) interface are used as the network I/F 108.

The controller 100 is configured by the combination of the hardware devices and the software programs. Specifically, the controller 100 is configured by the hardware devices such as an integrated circuit and the software control unit configured to operate in such a manner that the control programs such as firmware stored in the ROM 30, a non-volatile memory, and non-volatile recording media such as the HDD 50 and an optical disk are loaded in a volatile memory (hereinafter referred to as a memory) such as the RAM 20 and operated in accordance with the control of the CPU 10. The controller 100 functions as a control unit that controls the entire image forming apparatus 1.

The main control unit 111 plays a role in controlling the units included in the controller 100 and issues instructions to the respective units. The engine control unit 112 serves as a driving unit that controls or drives the print engine 106, the scanner unit 102, etc. In addition, the engine control unit 112 detects a state in which two or more sheets are fed in an overlapped manner inside the image forming apparatus 1 (hereinafter referred to as overlapped feeding) and prevents the occurrence of the overlapped feeding in the next sheet feeding. Details about the functions of the engine control unit 112 are described below.

The input/output control unit 113 inputs signals and instructions input via the network I/F 108 to the main control unit 111. Further, the main control unit 111 controls the input/output control unit 113 and accesses other equipment via the network I/F 108.

The image processing unit 114 generates drawing information based on print information included in an input print job in accordance with the control of the main control unit 111. The drawing information is information required when the print engine 106 serving as an image forming unit draws an image to be formed in an image forming operation. Further, the print information included in the print job is image information converted by a printer driver installed in an information processing apparatus such as a PC into a format so that the image forming apparatus 1 can recognize.

Further, the image processing unit 114 processes image pickup data input from the scanner unit 102 to generate image data. The image data is information stored in the image forming apparatus 1 as a result of a scanning operation or stored in a file server, etc., connected via a network. The operations display control unit 115 sends/receives information to/from the display panel 104 and the main control unit 111.

When the image forming apparatus 1 operates as a printer, the input/output control unit 113 first receives a print job via the network I/F 108. The input/output control unit 113 transfers the received print job to the main control unit 111. Upon receipt of the print job, the main control unit 111 controls the image processing unit 114 to generate drawing information based on the print information included in the print job.

When the drawing information is generated by the image processing unit 114, the engine control unit 112 performs image formation on a sheet fed from the sheet feeding table 105 based on the generated drawing information. In other words, the print engine 106 functions as the image forming unit. As a specific mode of the print engine 106, an image forming mechanism using an ink jet system, an image forming mechanism using an electrophotographic system, etc., may be used. A document on which the print engine performs image formation is ejected to the sheet catching tray 107.

When the image forming apparatus 1 operates as a scanner, the operations display control unit 115 or the input/output control unit 113 transfers a scanning execution signal to the main control unit 111 in response to the operation of the display panel 104 by the user or a scanning execution instruction input from an external PC, etc., via the network I/F 108. The main control unit 111 controls the engine control unit 112 based on the received scanning execution signal.

The engine control unit 112 drives the ADF 101 to feed an object document set in the ADF 101 to the scanner unit 102. In addition, the engine control unit 112 drives the scanner unit 102 to pick up an image of the document fed from the ADF 101. Further, in case that a document is directly set in the scanner unit 102 (i.e., if no document is set in the ADF 101), the scanner unit 102 picks up an image of the set document in accordance with the control of the engine control unit 112. In other words, the scanner unit 102 functions as an image pickup unit.

In an image pickup operation, an image pickup device such as a CCD included in the scanner unit 102 optically scans a document. As a result, picked-up image information is generated based on optical information. The engine control unit 112 transfers the picked-up image information generated by the scanner unit 102 to the image processing unit 114. The image processing unit 114 generates image information based on the picked-up image information received from the engine control unit 112 in accordance with the control of the main control unit 111. The image information generated by the image processing unit 114 is stored in a storage medium inserted in the HDD 50 of the image forming apparatus 1.

In accordance with instructions from the user, the image information generated by the image processing unit 114 is directly stored in the HDD 50, etc., or sent to an external device via the input/output control unit 113 and the network I/F 108. In other words, the ADF 101 and the engine control unit 112 function as an image input unit.

Further, when the image forming apparatus 1 operates as a copier, the image processing unit 114 generates drawing information based on the picked-up image information that the engine control unit 112 receives from the scanner unit 102 or the image information generated by the image processing unit 114. Similar to the case of the print operation, the engine control unit 112 drives the print engine 106 based on the drawing information.

Figure 3:
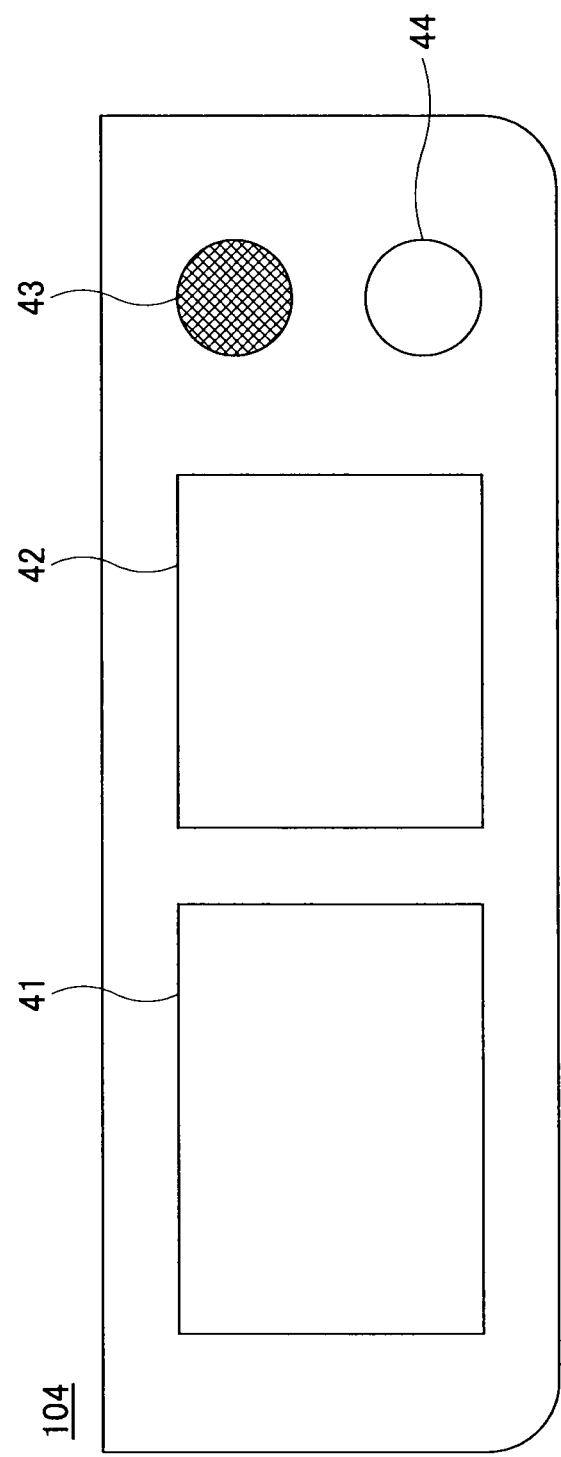
FIG. 3 is a front view showing the external appearance of a display panel according to the embodiment of the present invention.

In such the image forming apparatus 1, the configuration of the display panel 104 is the main point of the embodiment. Next, the display panel 104 according to the embodiment is described with reference to the drawing. FIG. 3 is a front view showing the external appearance of the display panel 104 according to the embodiment. As shown in FIG. 3, the display panel 104 according to the embodiment has a main display 41, a switch display 42, a speaker 43, and a start key 44.

The main display 41 is a touch panel serving as the main part of the display panel 104 and constitutes a user interface corresponding to a selected function from among a copying function, a print function, a facsimile function, a scanning function, etc. The switch display 42 is a touch panel serving as the sub-part of the main display 41 in the display panel 104 and constitutes a user interface where the user inputs numerals and alphabetical letters and switches the functions described above.

The speaker 43 is an output unit for outputting audio and serves to issue an error alert and assist blind/amblyopic/color-amblyopic persons. The start key 44 is a key serving as a button for instructing the execution of processing in any of the functions and configured by tact keys. For example, when the image forming apparatus 1 functions as a scanner, the start key 44 serves as a button for instructing the execution of scanning processing.

Note that the display panel 104 also has the same configuration as the hardware configuration described in FIG. 1. In other words, the display panel 104 is configured by the combination of hardware devices and a software control unit in which the programs stored in the ROM 30, the HDD 50, and a storage medium such as an optical disk, not shown, are read in the RAM 20 and operated in accordance with the control of the CPU 10.

Figure 4:
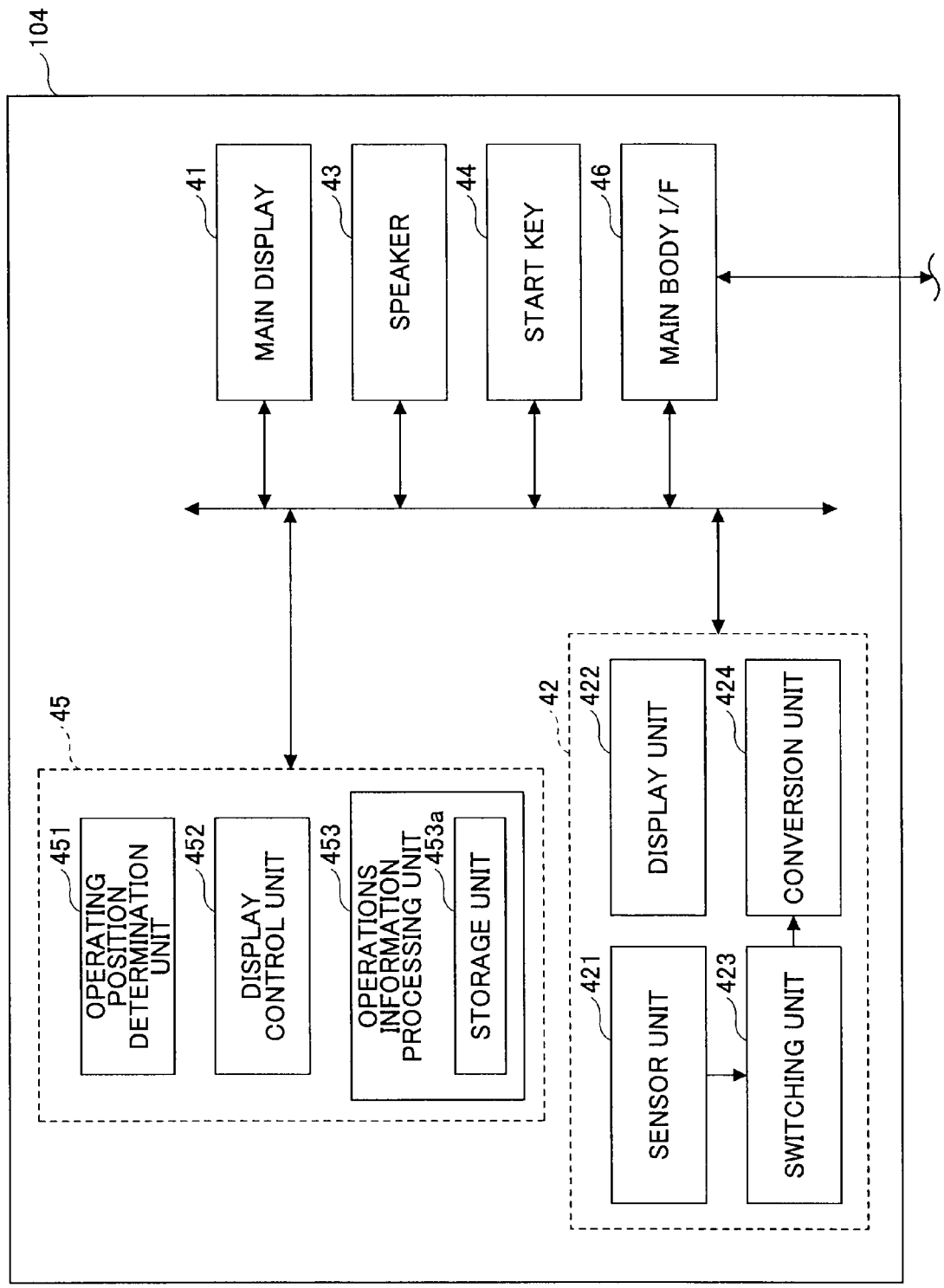
FIG. 4 is a block diagram showing the functional configuration of the display panel according to the embodiment of the present invention.

Next, FIG. 4 is a block diagram showing the functional configuration of the display panel 104 according to the embodiment. As shown in FIG. 4, the display panel 104 according to the embodiment has a controller 45 and a main body I/F 46 in addition to the main display 41, the switch display 42, the speaker 43, and the start key 44.

The controller 45 is a control unit that controls the operations of the display panel 104 and has an operating position determination unit 451, a display control unit 452, and an operations information processing unit 453 including a storage unit 453a. The operating position determination unit 451 determines a position at which the user operates in the switch display 42, i.e., a touched position.

The display control unit 452 controls the display of the main display 41 and the switch display 42. The operations information processing unit 453 processes information to be input in accordance with the operating position determined by the operating position determination unit 451. FIG. 5 shows information items stored in the operations information processing unit 453.

As shown in FIG. 5, the operations information processing unit 453 stores operating position corresponding information 453b related to the operations screen of the switch display 42 in the storage unit 453a. In other words, the operating information processing unit 453 functions as an operating position corresponding information storage unit. The operating position corresponding information 453b is a table in which position information items indicating the arrangement positions of component images constituting an operations screen displayed on the display unit 422 are associated with operations information items to be input corresponding to the position information items of the component images. The component images are images indicating, for example, alphanumeric characters, character strings, icons representing specific operations, etc.

As represented by "$X_{a11}, Y_{a11}-X_{b11}, Y_{b11}$" in FIG. 5, the position information items according to the embodiment are stored as the coordinate information items of the component images in the operations screen. For example, in FIG. 5, the operating position corresponding information 453b shows that the component image specified by the component image ID "001" of a screen ID "001" is arranged at the position designated by the position information item "$X_{a11}, Y_{a11}-X_{b11}, Y_{b11}$" in the operations screen specified by the screen ID "001." Further, the operating position corresponding information 453b shows that when a touched position on the operations screen of the screen ID "001" falls in the range of the position information item, it is determined that an operations information item "1" is input.

By referring to the operating position corresponding information 453b, the operations information processing unit 453 specifies the position information item in the operations screen including the operating position determined by the operating position determination unit 451, and then acquires the operating information item to be input corresponding to the position information item. In other words, the operations information processing unit 453 functions as an operations information acquisition unit.

Note that the screen IDs shown in FIG. 5 are IDs for identifying the screens displayed on the display unit of the switch display 42. The switch display 42 according to the embodiment functions as an information input unit capable of constituting various input interfaces by switching the screen displayed on the display unit 422. Accordingly, in the operating position corresponding information 453b, the position information item indicating the arrangement position of the component image in the operations screen and the operations information item input when the component image is touched are stored for each operations screen so as to be associated with each other. Note that the component image IDs are IDs for identifying the component images constituting each screen.

Further, the controller 45 has the function of controlling the speaker 43 and the start key 44 and the function of sending/receiving information to/from the main body I/F 46 serving as a communication interface with the controller 100 of the image forming apparatus 1. As described above, the controller 45 is configured to operate in such a manner that the programs loaded in the RAM 20 are operated in accordance with the control of the CPU 10.

The switch display 42 has a sensor unit 421, a display unit 422, a switching unit 423, and a conversion unit 424. The display unit 422 is configured to serve as a screen in the switch display 42 and realized by a LCD, etc. The sensor unit 421 is a general sensor for measuring a capacitance and arranged in a manner capable of measuring a capacitance at the front surface of the screen configured by the display unit 422. The sensor unit 421 is configured by plural sensors, each of which measures a capacitance, and outputs a signal corresponding to a measurement result of measuring the capacitance. The sensor unit 421 corresponds to the operations unit 80 for inputting information shown in FIG. 1 and is integrated with the display unit 422 in the switch display 42.

The switching unit 423 is a selector that selects one of the plural sensors included in the sensor unit 421 and inputs the output signal of the selected sensor to the conversion unit 424. The conversion unit 424 A/D (Analog/Digital)-converts the signal input from the switching unit 423 into an information format capable of being processed by the controller 45, i.e., the CPU.

The resulting information converted by the conversion unit 424 is input to the operating position determination unit 451 of the controller 45. The operating position determination unit 451 determines a position operated by the user in accordance with processing described below. The controller 45 acquires an instruction corresponding to a determination result by the operating position determination unit 451 and executes subsequent processing.

The subsequent processing executed by the controller 45 is, for example, to determine if there is any change in display contents of the main display 41 and the switch display 42 and cause the display control unit 452 to change the display contents of the main display 41 and the switch display 42. Further, when information input by the user is an instruction for operating the image forming apparatus 1, the controller 45 inputs the instruction to the controller 100 of the image forming apparatus 1 via the main body I/F 46.

Further, if a general audio operations guidance is output from the speaker 43 besides the operations input unit described above, it also becomes possible to assist blind/amblyopic/color-amblyopic persons.

Figure 6:
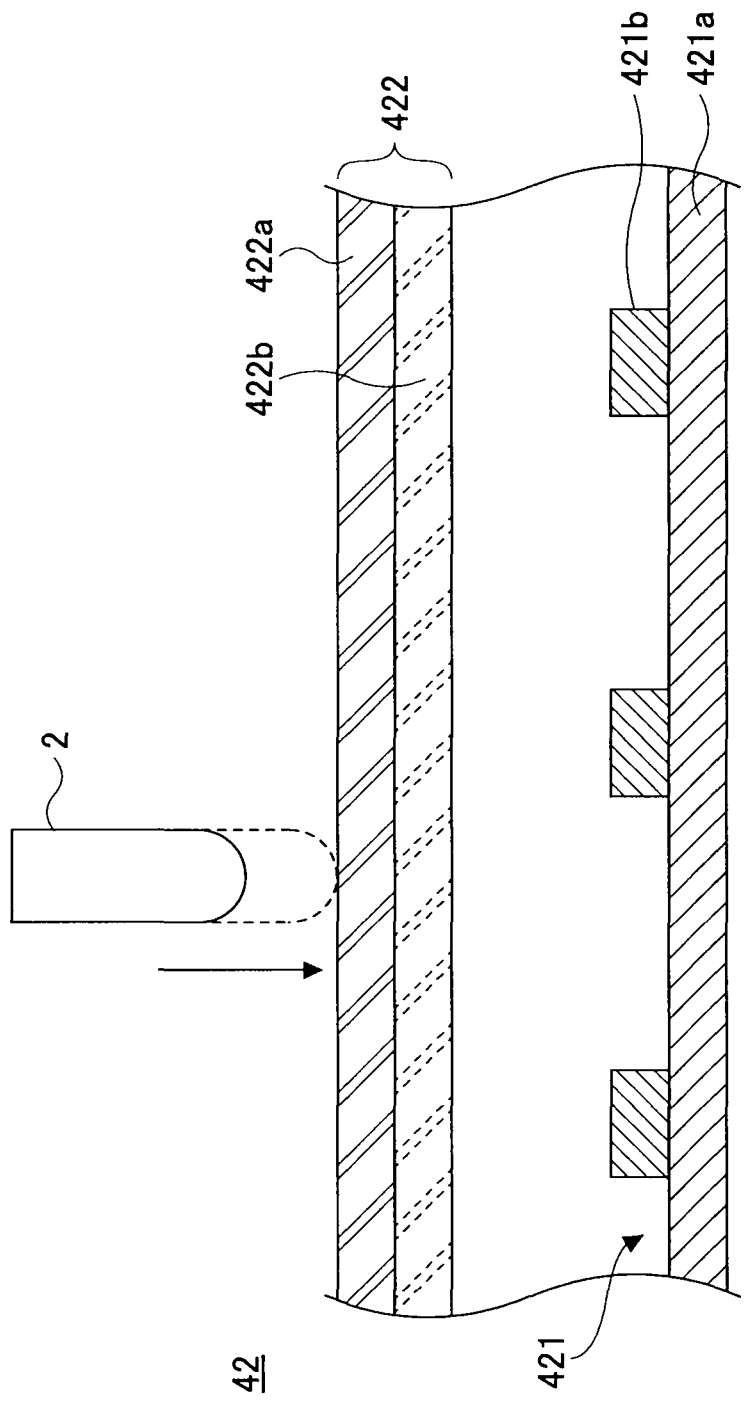
FIG. 6 is a cross-sectional view schematically showing a switch display according to the embodiment of the present invention.

Next, the switch display 42 is described in further detail. FIG. 6 is a cross-sectional view of the switch display 42. As shown in FIG. 6, the display unit 422 is configured by a transparent substrate 422a and a display panel 422b. The transparent substrate 422a is made of a glass, an acryl plate, etc., and serves as the surface of the switch display on which the user touches.

The display panel 422b is a display unit for displaying an operations screen in the switch display 42. The display panel 422b according to the embodiment is configured by a LCD. In addition to the LCD, the display panel 422b may be configured by a rewritable seal body, a color filter, an electronic paper, etc. Note that when a backlight is required as in the case of using the LCD as the display panel 422b, the backlight is provided on a sensor substrate 421a described below.

The sensor unit 421 is provided inside the display unit 422. The sensor unit 421 is configured by the sensor substrate 421a and the plural sensors 421b provided on the sensor substrate 421a. The plural sensors 421b measure a capacitance. Note that the switching unit 423 selects one of the plural sensors 421 shown in FIG. 6 and acquires an output signal from the sensor involved. Since it is possible to form the plural sensors 421b by patterning, the sensor unit 421 can be manufactured easily and at low cost.

Figure 7:
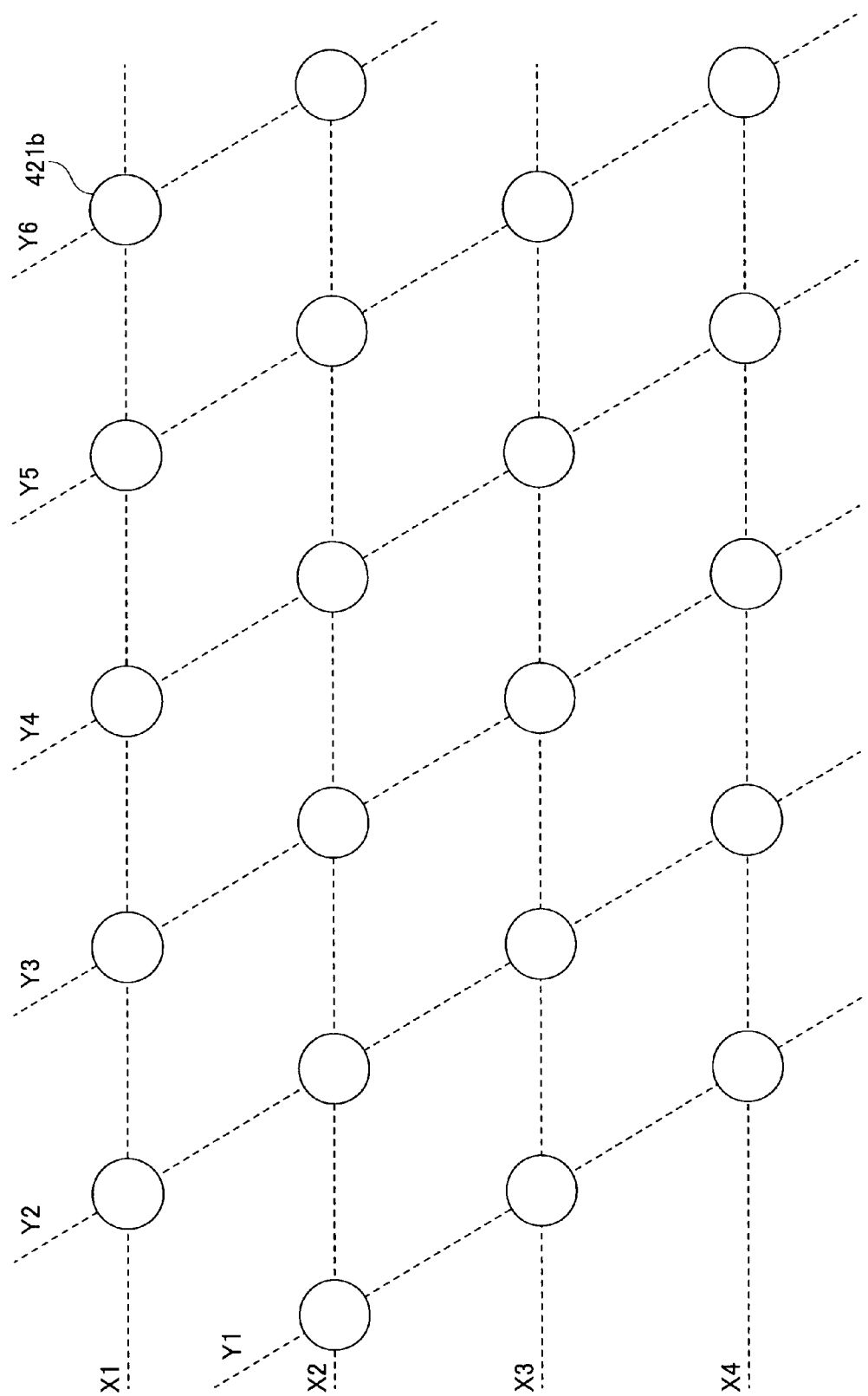
FIG. 7 is a top view showing the arrangement of sensors according to the embodiment of the present invention.

Next, the arrangement of the plural sensors 421b on the sensor substrate 421a is described with reference to FIG. 7. FIG. 7 is a diagram showing the arrangement state of the plural sensors 421b on the sensor substrate 421a, in which the substrate surface of the sensor substrate 421a in the sensor unit 421 is seen from its front side. X1, X2, X3, etc., and Y1, Y2, Y3, etc., shown in FIG. 7 indicate directions used when the switching unit 423 selects one of the plural sensors 421b.

As shown in FIG. 7, in the sensor unit 421 according to the embodiment, the plural sensors 421b are arranged on the sensor substrate 421a in a staggered manner such that three of the sensors 421 adjacent to each other are arranged at positions corresponding to the apices of a regular triangle. Although FIG. 7 shows a part of the sensor substrate 421a, the plural sensors 421b are actually arranged on the entire surface of the display screen of the switch display 42, i.e., across the front surface of the transparent substrate 422a under the arrangement pattern shown in FIG. 7. With this arrangement, the sensor unit 421 can detect a position on the transparent substrate 422a touched by the user with the three sensors 421b.

FIG. 8 is a diagram schematically showing a state in which operations are detected with the sensor unit 421. As shown in FIG. 8, when an electrostatic substance 2 such as the finger of the user and a touch pen touches the transparent substrate 422a, there occurs a change in a detection result of detecting a capacitance with the sensors 421b arranged adjacent to the touched position. The operation by the user is thus detected.

In an example shown in FIG. 8, sensors A, B, and C among the plural sensors 421 detect the change in the capacitance.

The plural sensors 421b continuously measure a capacitance, and the switching unit 423 switches each of the plural sensors 421b to acquire the detection result of detecting the capacitance. The value of the capacitance acquired by the switching unit 423 is input to the operating position determination unit 451 after being converted by the conversion unit 424. Thus, the operating position determination unit 451 determines an operating position.

When the apparatus is in operation, the switch display 42 acquires a capacitance while switching the sensors 421b by the switching unit 423. For example, the switching unit 423 first acquires the output signal of the sensor 421b at the position (X1, Y1) and inputs the acquired output signal to the conversion unit 424. Then, by switching to the sensor at the position (X1, Y2) to acquire an output signal, the switching unit 423 acquires the output signal and inputs the acquired output signal to the conversion unit 424. With the repetition of such processing, the output signals of all the sensors 421b provided on the sensor substrate 421a are converted by the conversion unit 424 and then processed by the operating position determination unit 451.

Figure 9B:
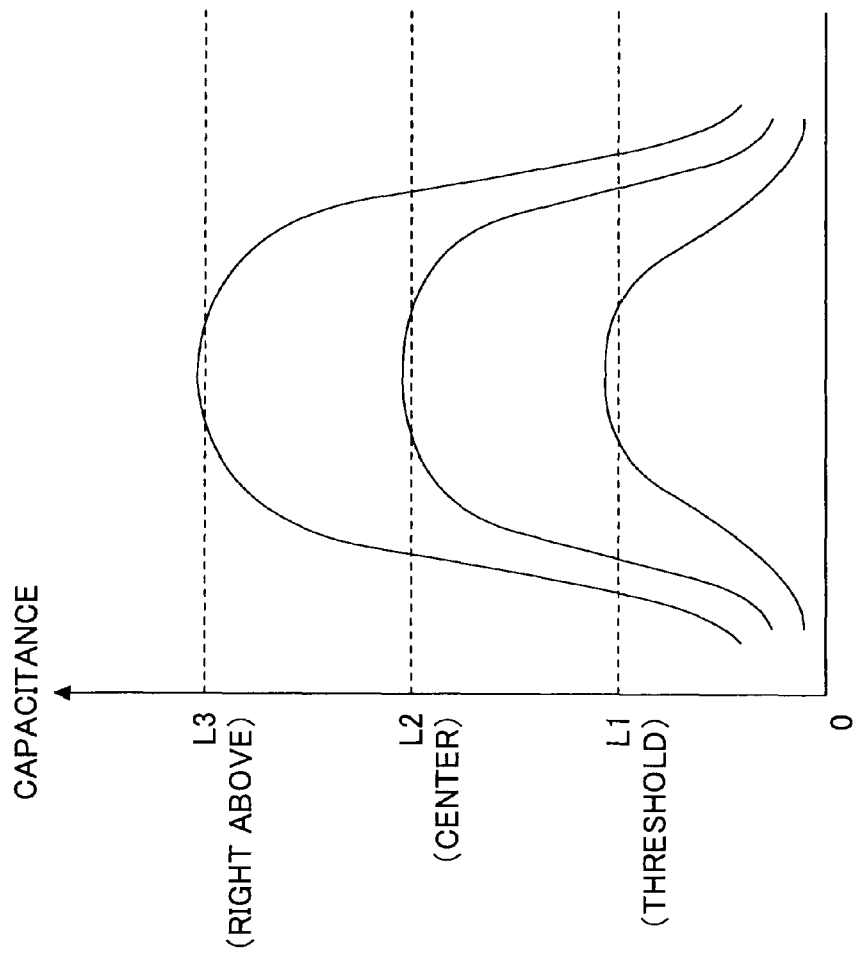
FIGS. 9A and 9B are diagrams for illustrating a corresponding relationship between touched positions of an electrostatic substance and capacitance levels.
Figure 9A:
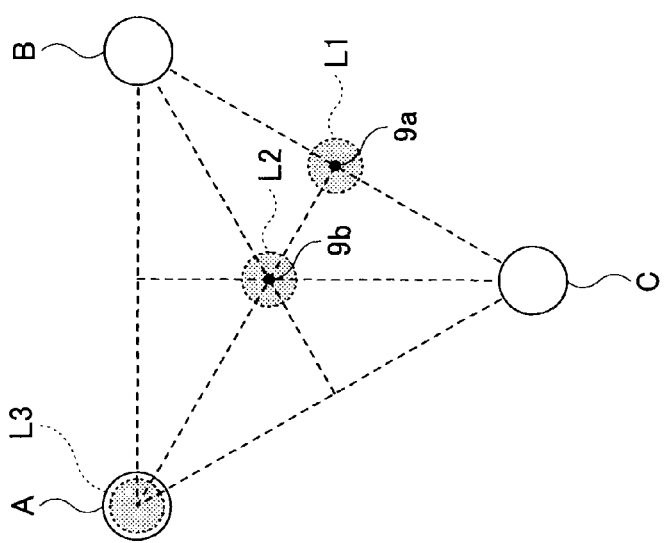

FIGS. 9A and 9B show a corresponding relationship between touched positions of the electrostatic substance and capacitance levels. FIG. 9A is a diagram for illustrating the corresponding relationship between the touched positions of the electrostatic substance and the capacitance levels. FIG. 9B is a diagram showing an example of the capacitance levels. In FIG. 9A, the embodiment focuses on the capacitance level of the sensor A serving as a basis for detecting the touched positions of the electrostatic substance with the three sensors A, B, and C.

First, in a regular triangle in which the sensors A, B, and C are arranged at positions corresponding to the apices of the regular triangle, the capacitance level L1 indicates a capacitance for detecting the contact of the electrostatic substance 2 with the midpoint 9a of a straight line that connects the sensors B and C to each other and forms an opposite side relative to the sensor A. Further, the capacitance level L1 is a threshold for detecting the contact of the electrostatic substance 2 with the switch display 42.

Next, the capacitance level L2 indicates a capacitance for detecting the contact of the electrostatic substance 2 with the center 9b of the regular triangle formed by the sensors A, B, and C.

Further, the capacitance level L3 indicates a capacitance for detecting the contact of the electrostatic substance 2 with the position right above the sensor A.

As shown in FIG. 9B, a relationship between the capacitance levels L1, L2, and L3 is defined as L1<L2<L3. The capacitance level L2 refers to the capacitance at the center 9b. Therefore, when the capacitances detected with the three sensors A, B, and C are approximately the same, it can be detected that the touched position is the center 9b. Further, it can be detected from the capacitance level L3 that the position right above the sensor A is touched when the capacitance exceeding the threshold (capacitance level L1) is detected with the sensor A but not detected with the adjacent sensors B and C. Accordingly, it is only required to have at least information on the capacitance level L1 as the threshold in the operating position determination unit 451.

When the detection level detected with the sensor A falls in a range from the capacitance level L2 to the capacitance level L3, the sensor A can detect a capacitance in a range having the distance from the sensor A to the center 9b as its radius in FIG. 9A.

Further, when the detection level of the sensor A falls in a range from the capacitance level L1 to the capacitance level L2, the sensor A can detect the capacitance of a difference between a range having the distance from the sensor A to the midpoint 9a as its radius and the range having the distance from the sensor A to the center 9b as its radius.

The same applies to the other sensors B and C. Based on such a relationship, a description is made of a method for detecting the touched position of the electrostatic substance 2 in the area of the regular triangle formed by the three sensors A, B, and C.

Figure 10A:
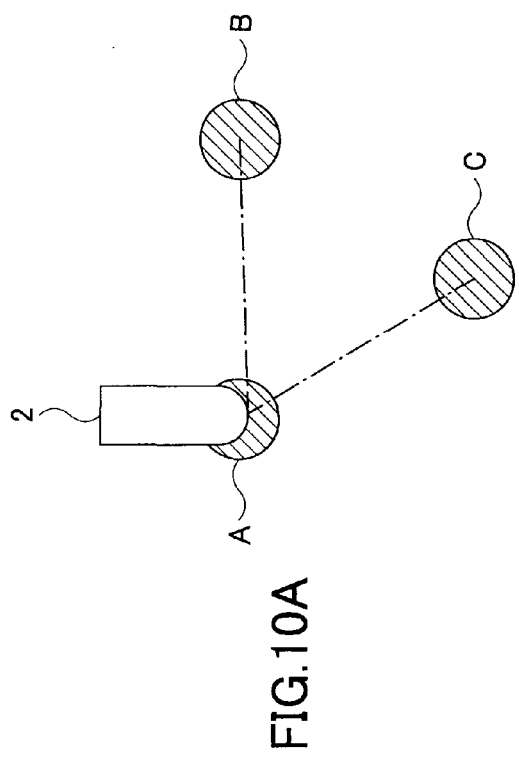
FIGS. 10A and 10B are diagrams showing a positional relationship between the sensors and the electrostatic substance and detection signals of the sensors according to the embodiment of the present invention.
Figure 10B:
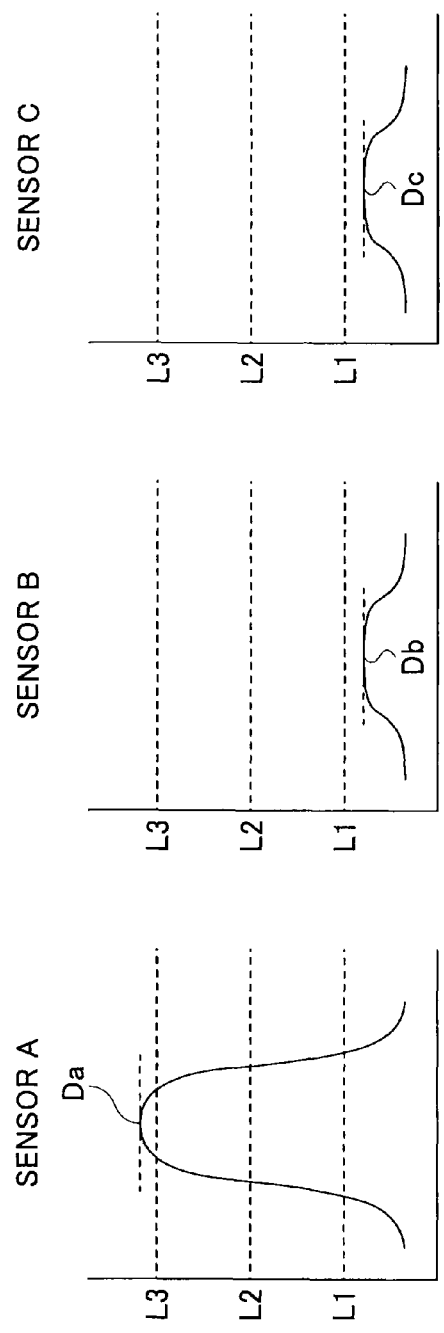

Next, a relationship between the touched position relative to the three sensors and detection results of detecting a capacitance with the three sensors is described. First, a description is made of a case in which the touched position is right above the sensor A. FIG. 10A is a diagram showing an example in which the touched position is right above the sensor A among the three sensors. In this case, as shown in FIG. 10B, a detection level Da detected with the sensor A is greater than the capacitance level L3, while detection levels Db and Dc detected with the sensors B and C are approximately the same values smaller than or equal to the threshold (capacitance level L1). Note that the detection levels shown in FIG. 10B are information converted by the conversion unit 424 and input to the operating position determination unit 451.

Using the capacitance levels L1, L2, and L3 as the basis, the operating position determination unit 451 determines the touched position of the electrostatic substance 2 based on the detection level detected with the sensor that exceeds the capacitance level L1 serving as the threshold. As shown in FIG. 10B, when it is determined that only the detection level detected with the sensor A exceeds the threshold, a relationship between the detection levels detected with the respective sensors and the threshold is defined as the detection level Da>the threshold (capacitance level L1)>the detection level Db=the detection level Dc. In this case, the operating position determination unit 451 determines that the position right above the sensor A is touched.

Figure 11A:
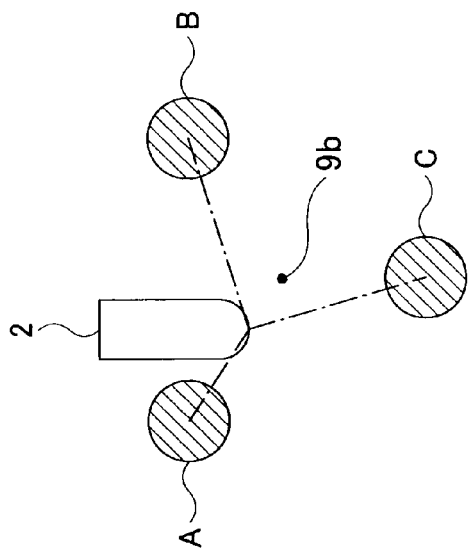
FIGS. 11A and 11B are diagrams showing the positional relationship between the sensors and the electrostatic substance and the detection signals of the sensors according to the embodiment of the present invention.

Next, a description is made of a case in which the touched position is adjacent to the sensor A. FIG. 11A is a diagram showing an example in which the touched position is not right above the sensor A but is adjacent to the sensor A in the range from the sensor A to the center 9b. In this case, as shown in FIG. 11B, the detection level Da detected with the sensor A is smaller than or equal to the capacitance level L3 but greater than the capacitance level L2, while the detection levels Db and Dc detected with the sensors B and C are smaller than the capacitance level L2 but greater than the threshold (capacitance level L1).

Figure 11B:
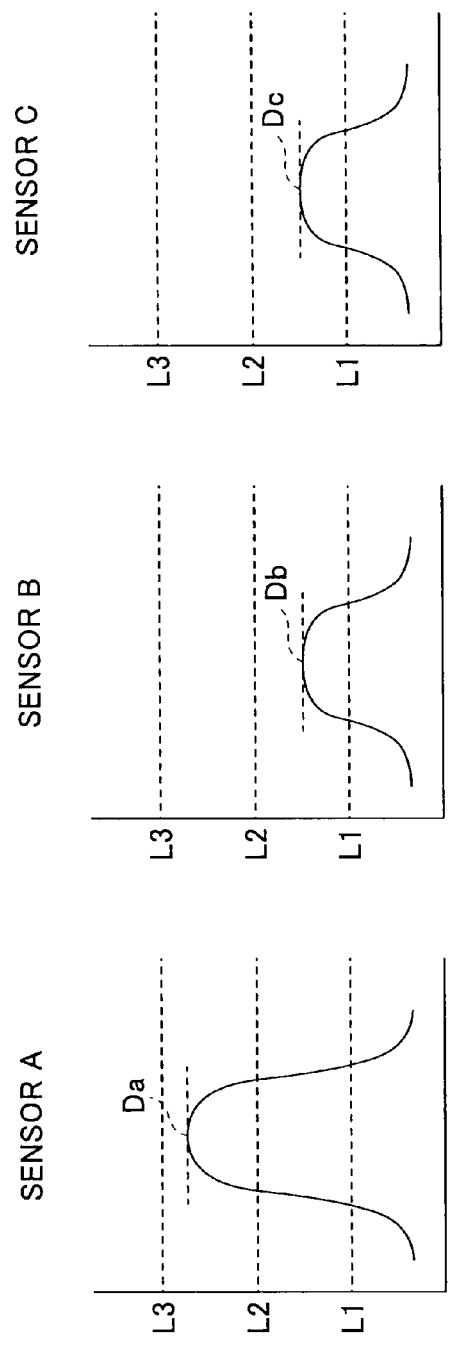

As shown in FIG. 11B, when the touched position is not right above the sensor A and is close to the sensors B and C in the range from the sensor A to the center 9b, the detection levels detected with the sensors B and C are smaller than or equal to the capacitance level L2 but greater than the threshold (capacitance level L1). Therefore, the operating position determination unit 451 determines that all the sensors A, B, and C receive an operational input.

In an example shown in FIG. 11B, although it is determined that all the sensors A, B, and C receive the operational input, a relationship between the detection levels Da, Db, and Dc and the threshold (capacitance level L1) is defined as the detection level Da>the detection level Db=the detection level Dc>the threshold (capacitance level L1). In this case, the operating position determination unit 451 determines that the position adjacent to the sensor A in an area surrounded by the sensors A, B, and C is touched.

Note that the operating position determination unit 451 determines the touched position in detail based on the values of the detection levels detected with the detection sensors A, B, and C. In the case of FIG. 11B, since the detection levels Db and Dc show approximately the same values, it is determined that distances from each of the sensors B and C to the touched position are the same. Further, the operating position determination unit 451 determines the distance from the sensor A to the touched position in accordance with the detection levels Da, Db, and Dc detected with the sensors A, B, and C.

Figure 12A:
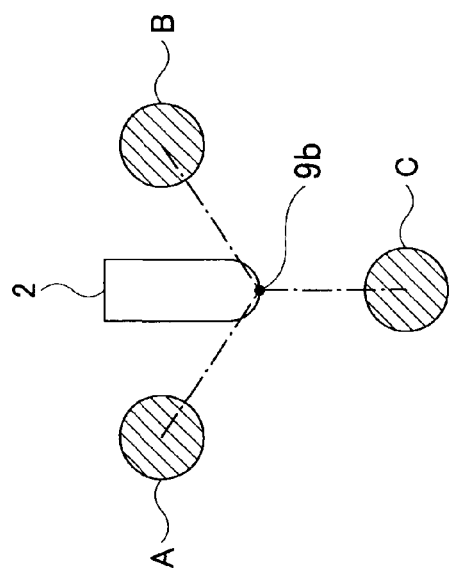
FIGS. 12A and 12B are diagrams showing the positional relationship between the sensors and the electrostatic substance and the detection signals of the sensors according to the embodiment of the present invention.

Next, a description is made of a case in which the touched position is the center of the sensors A, B, and C. FIG. 12A is a diagram showing an example in which the touched position is the center of the sensors A, B, and C. In this case, as shown in FIG. 12B, the detection levels Da, Db, and Dc detected with the sensors A, B, and C are approximately the same values exceeding the threshold.

As described with reference to FIG. 11B, when the touched position is not right above the sensor A and is close to the sensors B and C, the detection levels Db and Dc detected with the sensors B and C exceed the threshold. Accordingly, also in the case of FIG. 12A, the detection levels Da, Db, and Dc detected with the sensors A, B, and C are approximately the same values exceeding the threshold and the capacitance level L2. Therefore, in the state shown in FIG. 12A, the operating position determination unit 451 determines that all the sensors A, B, and C receive an operational input.

Figure 12B:
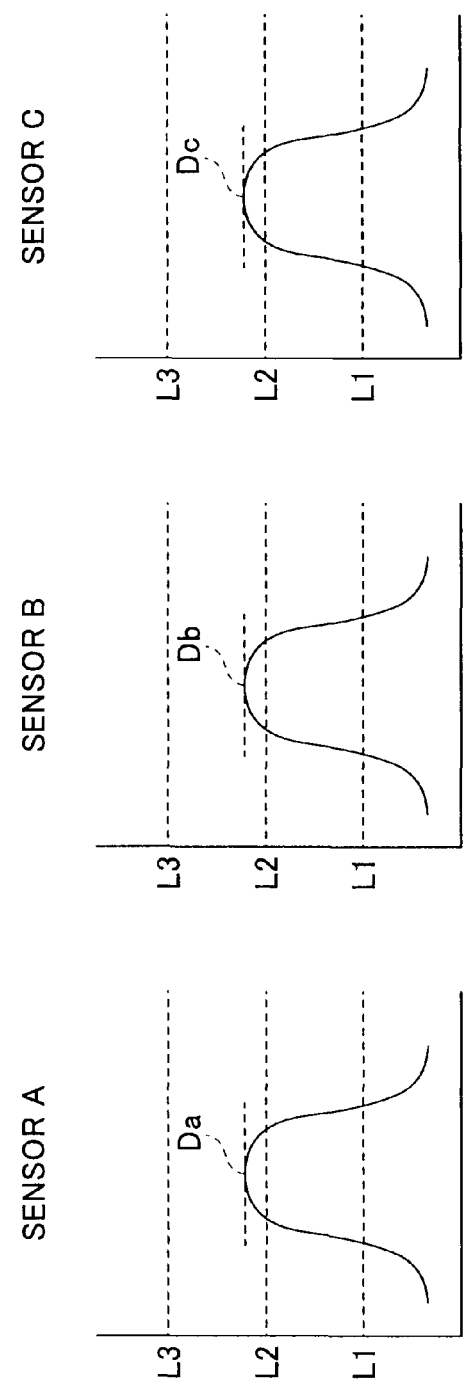

In an example shown in FIG. 12B, although it is determined that all the sensors A, B, and C receive the operational input, the relationship between the detection levels Da, Db, and Dc and the threshold is defined as the detection level Da=the detection level Db=the detection level Dc>the threshold (capacitance level L1). In this case, the operating position determination unit 451 determines that the center of the sensors A, B, and C in the area surrounded by the sensors A, B, and C is touched.

Note that as described above, the operating position determination unit 451 determines the touched position in detail based on the values of the detection levels detected with the detection sensors A, B, and C. In the case of FIG. 12B, since the detection levels Da, Db, and Dc show approximately the same values, it is determined that distances from each of the sensors A, B, and C to the touched position are approximately the same.

Moreover, a description is made of a case in which the touched position is a midpoint between the sensors B and C on the opposite side relative to the sensor A. FIG. 13A is a diagram showing the case in which the touched position is the midpoint between the sensors B and C. In this case, as shown in FIG. 13B, the detection level Da detected with the sensor A is approximately the same as the threshold, while the detection levels Db and Dc detected with the sensors B and C are approximately the same values exceeding the threshold. The relationship between the detection levels Da, Db, and Dc and the threshold (capacitance level L1) is defined as the detection level Db=the detection level Dc>the detection level Da=the threshold. In this case, the operating position determination unit 451 determines that the midpoint between the sensors A and B is touched.

Figure 14:
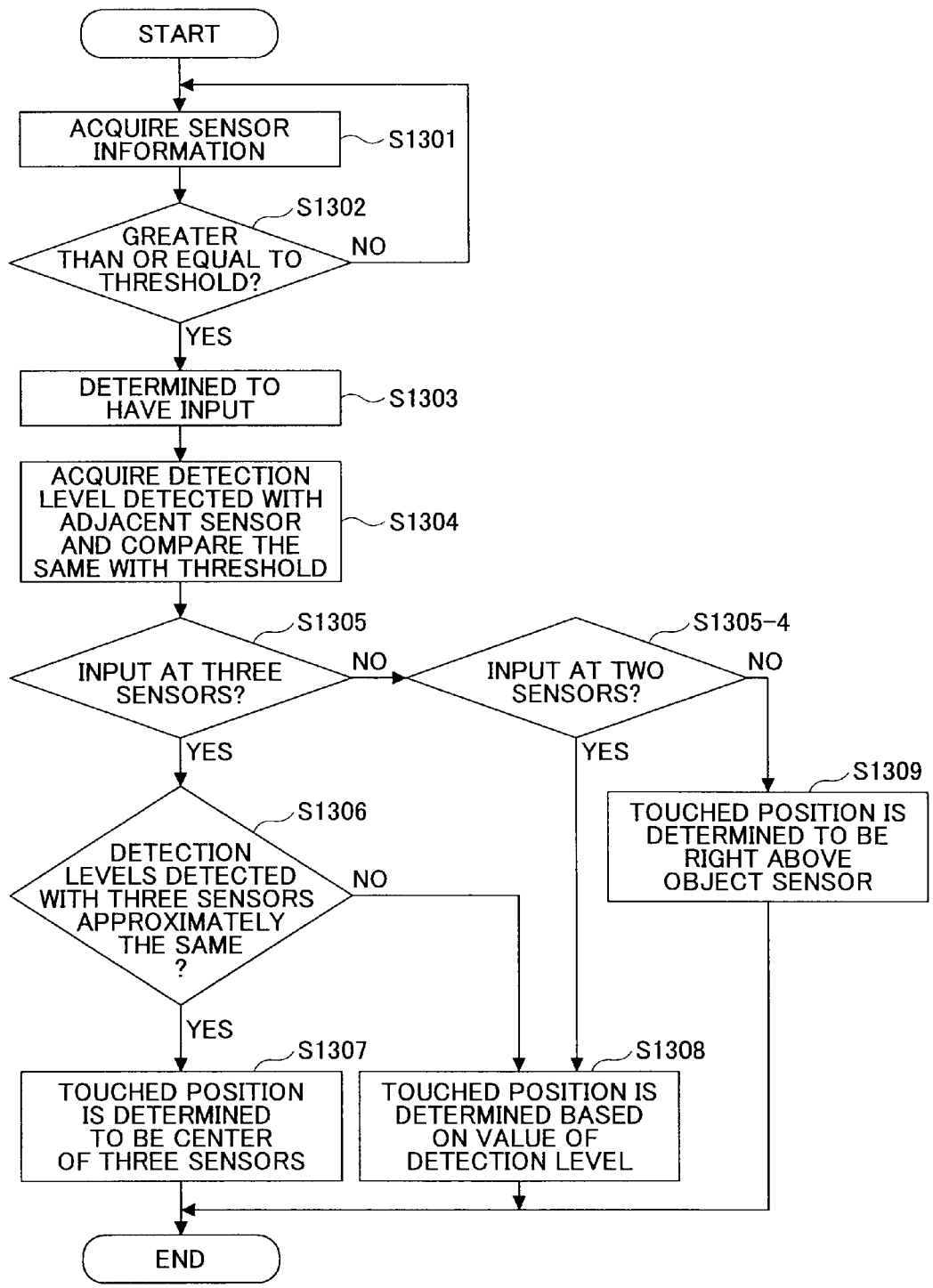
FIG. 14 is a flowchart showing the determination operation of determining the touched position according to the embodiment of the present invention.

Next, a description is made of the determination operation of determining the touched position of the switch display 42 in the display panel 104 according to the embodiment. FIG. 14 is a flowchart showing the determination operation of determining the touched position according to the embodiment. First, when the detection signal of the sensor 421b selected by the switching unit 423 is converted by the conversion unit 424 and input to the operating position determination unit 451, the operating position determination unit 451 acquires the detection level detected with an object sensor (S1301).

Upon acquisition of the detection level, the operating position determination unit 451 compares the acquired detection level with a set threshold (S1302). When the acquired detection level is less than the set threshold as a result of the comparison in S1302 (No in S1302), the operating position determination unit 451 repeatedly performs the processing after step S1301.

On the other hand, when the acquired detection level is greater than or equal to the set threshold as a result of the comparison in S1302 (Yes in S1302), the operating position determination unit 451 determines that the object sensor 421b receives an operational input (S1303). When it is determined that the one sensor 421b receives the operational input, the operating position determination unit 451 acquires the detection levels detected with the other sensors 421b adjacent to the one sensor 421b and compares the acquired detection levels with the set threshold (S1304).

As shown in FIG. 7, the number of the sensors 421 adjacent to the one sensor 421b is six. Therefore, in S1304, the operating position determination unit 451 acquires the detection levels detected with the six sensors 421b. When the detection levels detected with the three sensors 421b including the one determined to receive the operational input in S1303 are greater than or equal to the threshold as a result of the comparison in S1304 (Yes in S1305), the operating position determination unit 451 compares the values of the detection levels detected with the three sensors 421b with each other (S1306).

When the values of the detection levels detected with the three sensors 421b are the same as a result of the comparison in S1306 (Yes in S1306), the operating position determination unit 451 determines that the center of the regular triangle formed by the three sensors 421b is the touched position as described in FIGS. 12A and 12B (S1307) and then completes the entire processing.

When the values of the detection levels detected with the three sensors 421b are not the same as a result of the comparison in S1306 (No in S1306), the operating position determination unit 451 determines the touched position based on the relationship between the detection levels detected with the three sensors 421b as described in FIGS. 11A, 11B, 13A, and 13B (S1308) and then completes the processing.

On the other hand, when only the detection level detected with the sensor 421b determined to receive the operational input in S1303 or the detection levels detected with the two sensors including the one adjacent sensor 421 is greater than or equal to the threshold as a result of the detection in S1304 (No in S1305), the operating position determination unit 451 further determines whether there is any detection level that is detected with the adjacent sensor 421b and greater than or equal to the threshold (S1305-4). When the detection levels detected with the two sensors 421b including the one adjacent sensor 421 are greater than or equal to the threshold (Yes in S1305-4), the operating position determination unit executes the processing in S1308 and then completes the entire processing.

When only the detection level detected with the sensor 421b determined to receive the operational input in S1303 is greater than or equal to the threshold as a result of the processing in S1305 (No in S1305-4), the operating position determination unit 451 determines that the touched position is right above the sensor 421b determined to receive the operational input in S1303 as described with reference to FIGS. 10A and 10B (S1309) and then completes the entire processing.

With the above processing, the determination operation of determining the touched position in the switch display 42 according to the embodiment is completed.

As described above, the switching unit 423 successively acquires the output signals from the plural sensors 421b and inputs the acquired output signals to the conversion unit 424, and then the conversion unit 424 converts the output signals input from the switching unit 423 and sends the converted output signals to the operating position determination unit 451 as the information indicating the detection levels. The period until the detection level detected with the next sensor 421b is input to the operating position determination unit 451 after the input of the detection level detected with the one sensor 421b to the operating position determination unit 451 is, for example, in the range of 1µ second through 1 m second. In S1302 of FIG. 14, such the processing is repeatedly applied to the respective sensors 421b sequentially until it is determined that the detection level is greater than or equal to the threshold. Then, when one of the sensors 421b is determined to receive the operational input in S1303, the operating position determination unit determines the sensor 421 involved as the object sensor and executes the processing after S1304.

Figure 15:
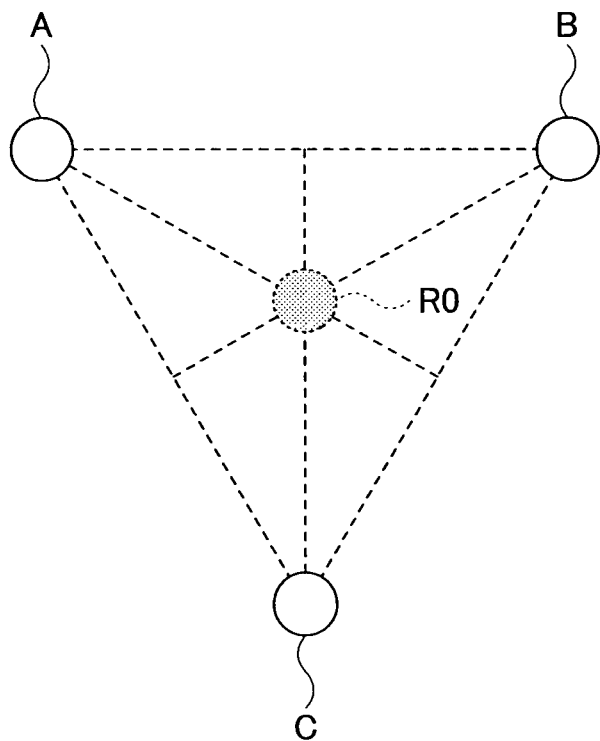
FIG. 15 is a diagram exemplifying the region detected in S1307 of FIG. 14.

Next, a description is made of regions capable of being detected by the processing described in FIG. 14. FIG. 15 is a diagram exemplifying the region detected in S1307 of FIG. 14. When it is determined that the detection levels detected with the sensors A, B, and C are approximately the same in S1306 of FIG. 14, the center region RO of the regular triangle formed by the sensors A, B, and C in FIG. 15 is determined to be the touched position in step S1307 of FIG. 14.

Figure 16A:
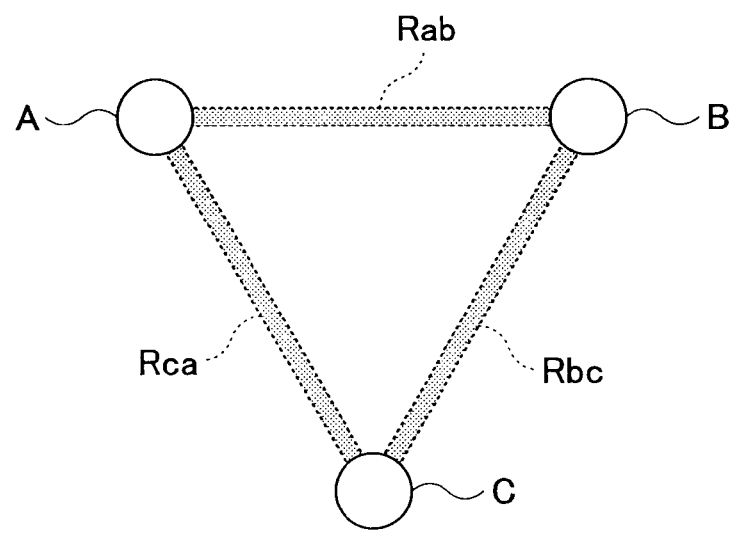
FIGS. 16A through 16C are diagrams exemplifying the regions detected in step S1308 of FIG. 14.
Figure 16B:
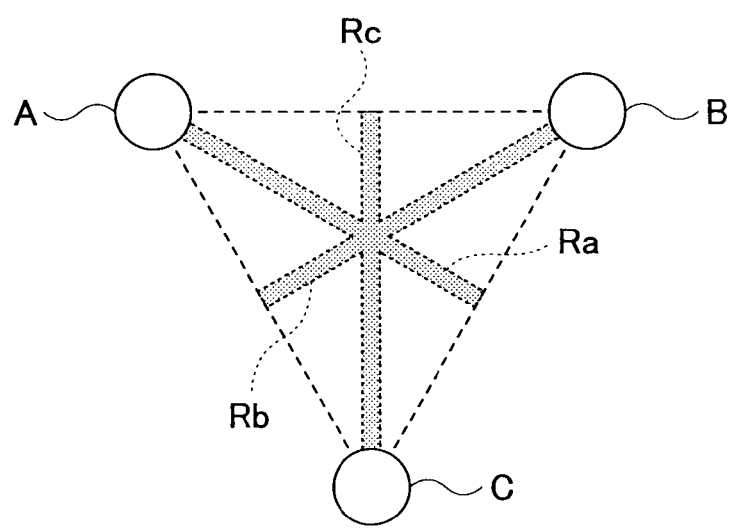
Figure 16C:
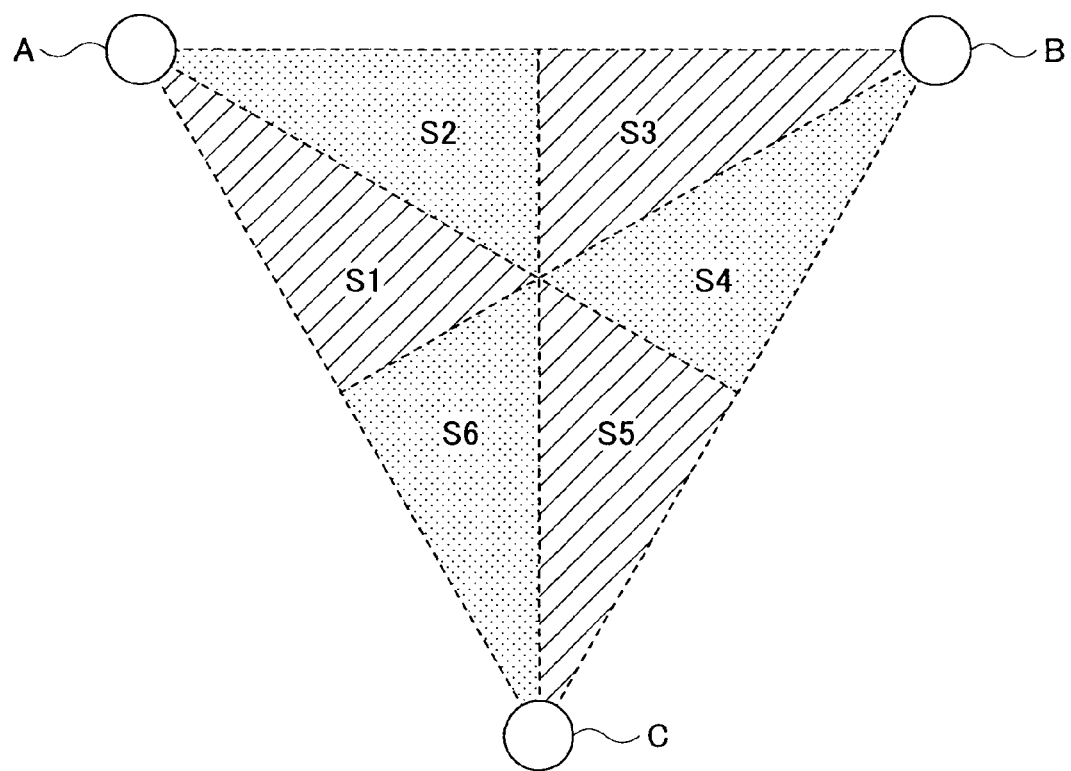

FIGS. 16A through 16C are diagrams exemplifying the regions detected in S1308 of FIG. 14. Provided that two of the detection levels detected with the sensors A, B, and C are determined to be greater than or equal to the threshold in S1305-4, FIG. 16A shows the regions Rab, Rbc, and Rca where the touched position is detected based on the relationship between the detection levels detected with the two sensors in S1308.

The region Rab is a straight line connecting the sensors A and B to each other. In this region, the touched position is determined based on the relationship between the detection levels detected with the sensors A and B. In this case, the detection levels detected with the sensors A and B are greater than or equal to the threshold, while the detection level detected with the sensor C is less than the threshold. When the detection levels detected with the sensors A and B are approximately the same, it is determined that the center of the straight line (region Rab) connecting the sensors A and B to each other is the touched position.

The region Rbc is a straight line connecting the sensors B and C to each other. In this region, the touched position is determined based on the relationship between the detection levels detected with the sensors B and C. In this case, the detection levels detected with the sensors B and C are greater than or equal to the threshold, while the detection level detected with the sensor A is less than the threshold. When the detection levels detected with the sensors B and C are approximately the same, it is determined that the center of the straight line (region Rbc) connecting the sensors B and C to each other is the touched position.

The region Rca is a straight line connecting the sensors A and C to each other. In this region, the touched position is determined based on the relationship between the detection levels detected with the sensors A and C. In this case, the detection levels detected with the sensors A and C are greater than or equal to the threshold, while the detection level detected with the sensor B is less than the threshold. When the detection levels detected with the sensors A and C are approximately the same, it is determined that the center of the straight line (region Rca) connecting the sensors A and C to each other is the touched position.

Provided that all the detection levels detected with the sensors A, B, and C are determined to be greater than or equal to the threshold but are not approximately the same in S1306, FIG. 16B shows the regions Ra, Rb, and Rc where the touched position is detected based on the detection level detected with one sensor when the detection levels detected with the other two sensors are approximately the same in S1308.

The region Ra is a median line from the sensor A to an opposite side. In this region, the detection levels detected with the sensors B and C are approximately the same, and the touched position is determined based on the detection level detected with the sensor A.

The region Rb is a median line from the sensor B to an opposite side. In this region, the detection levels detected with the sensors A and C are approximately the same, and the touched position is determined based on the detection level detected with the sensor B.

The region Rc is a median line from the sensor C to the opposite side. In this region, the detection levels detected with the sensors A and B are approximately the same, and the touched position is determined based on the detection level detected with the sensor C.

Provided that all the detection levels detected with the sensors A, B, and C are determined to be greater than or equal to the threshold but are not approximately the same in S1306, FIG. 16C shows the regions S1, S2, S3, S4, S5, and S6 where the touched position is detected based on the relationship between the detection levels Da, Db, and Dc with the three sensors in S1308.

The region S1 is the touched position detected based on the detection levels where Da>Dc>Db. The region S2 is the touched position detected based on the detection levels where Da>Db>Dc.

The region S3 is the touched position detected based on the detection levels where Db>Da>Dc. The region S4 is the touched position detected based on the relationship between the detection levels where Db>Dc>Da.

The region S5 is the touched position detected based on the detection levels where Dc>Db>Da. The region S6 is the touched position detected based on the detection levels where Dc>Da>Db.

Figure 17:
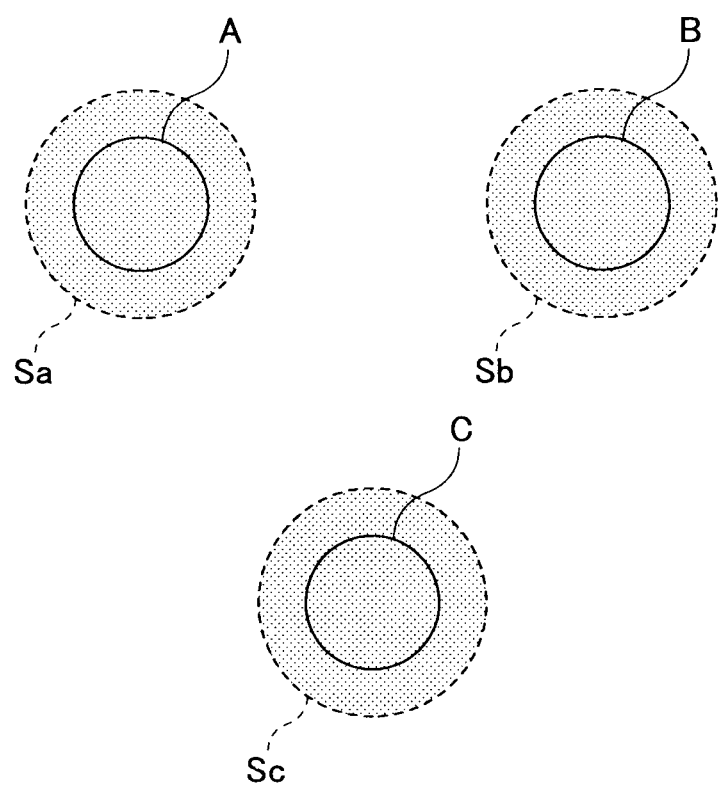
FIG. 17 is a diagram exemplifying the regions detected in S1309 of FIG. 14.

FIG. 17 is a diagram exemplifying the regions detected in S1309 of FIG. 14. Provided that two of the detection levels detected with the sensors A, B, and C are determined to be less than the threshold in S1305-4, FIG. 17 shows the regions Sa, Sb, and Sc where the touched position is determined to be right above the object sensor in S1309.

The region Sa is right above the sensor A and determined to be the touched position when only the detection level detected with the sensor A is greater than or equal to the threshold.

The region Sb is right above the sensor B and determined to be the touched position when only the detection level detected with the sensor B is greater than or equal to the threshold.

The region Sc is right above the sensor C and determined to be the touched position when only the detection level detected with the sensor C is greater than or equal to the threshold.

As described above, according to the embodiment, the touched position can be specified based on the divided sixteen regions shown in FIGS. 15 through 17 in accordance with the detection levels detected with the three sensors. On the other hand, when the touched position is specified between the sensors arranged in a lattice pattern in a conventional manner, many sensors are required as shown in FIG. 18.

Figure 18:
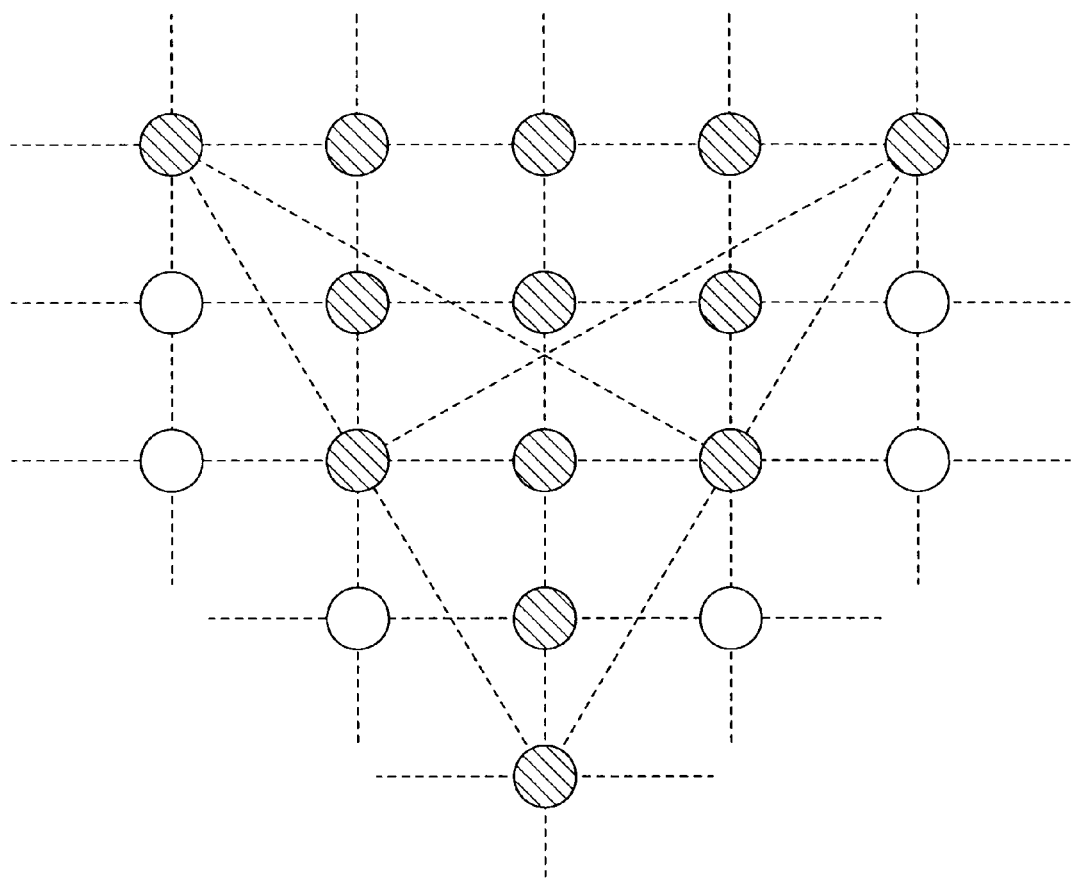
FIG. 18 is a diagram showing an example of arranging the sensors in a lattice pattern so as to realize detection accuracy in detecting the touched position with the three sensors according to the embodiment.

FIG. 18 is a diagram showing an example of arranging the sensors in a lattice pattern so as to realize detection accuracy in detecting the touched position with the three sensors according to the embodiment. The lattice-shaped arrangement of the sensors shown in FIG. 18 is dedicated to detect at least the positions right above the three sensors in the embodiment, the midpoints of the sides having the sensors as apices, and the regions formed by the three sensors. This example requires the thirteen sensors, while the embodiment according to the embodiment requires the three sensors.

According to the embodiment, the detection accuracy in detecting the touched position can be improved by the comparison of the detection levels detected with the two or three sensors, particularly in the respective regions shown in FIGS. 16A, 16B, and 16C among the sixteen regions.

As described above, according to the embodiment, the detection accuracy in detecting the touched position can be improved in the information input device integrated with the display screen like the switching display 42 without increasing the number of the sensors.

According to the embodiment, when the touched position by the user is determined based on the combination of the plural sensors 421b, an arrangement interval between the respective sensors 421b can be made greater than the thickness of the finger of the user. Even in this case, the touched position can be specified in the region surrounded by the three sensors based on the divided sixteen regions shown in FIGS. 15 through 17. Accordingly, in order to solve the above conventional problems, the touched position can be determined accurately with the lesser sensors 421b.

Note that according to the embodiment, the respective sensors 421b are arranged in a staggered manner as shown in FIG. 7 such that three of the sensors 421b adjacent to each other are arranged at positions corresponding to the apices of the regular triangle. Accordingly, as described in FIG. 8, etc., the touched position is determined with the three sensors 421b.

Alternatively, the sensors 421b may be arranged so as to form a square-shaped lattice. Even in this case, the touched position can be determined with the three sensors 421b as described above or with the four sensors 421b.

Further, according to the embodiment, the threshold is set with respect to the detection levels generated when the detection signals of the sensors 421b are converted by the conversion unit 424, and the detection levels are compared with the threshold to determine whether the sensors receive an operational input.

Further, with the setting of the threshold, the three sensors at a maximum are determined to receive an operational input as described above. Thus, in the processing of S1306, S1308, etc. of FIG. 14, the operating position determination unit 451 is only required to refer to three parameters at a maximum at the time of determining the touched position, which in turn makes it possible to simplify the processing.

Moreover, the threshold may be set so as to determine, for example, whether outputs of the sensors are in a steady state, i.e., whether no operational input is made. In this case, the operating position determination unit 451 determines the touched position by referring to the detection level detected with the sensor whose output has changed from a steady state.

Further, according to the embodiment, the determination based on the "touched position" by the user is made as an example. However, as described above, the sensors 421b measure a capacitance and are capable of detecting a change in the capacitance even when the user gets the finger close to the transparent substrate 422a rather than touching the same.

Accordingly, the operating position determination unit 451 can also determine an operating position without relying on the touched position.

Moreover, the touched position can be specified within the region formed by the three sensors at the position corresponding to the apices of a regular triangle in accordance with the detection levels of the capacitances detected with the adjacently-arranged three sensors. Therefore, the position information items in the operating position corresponding information 453*b* shown in FIG. 5 can be changed so as to correspond to the shapes of component images. For example, if the component image is a circle, a circular region can be formed based on the position information items of the central coordinate and the radius of the circle. Alternatively, plural shapes may be combined with each other to provide the position information items. Accordingly, since it is possible to provide the shapes of the component images with flexibility and specify the information items corresponding to the shapes as the position information items, the touched position can be detected accurately in accordance with the shapes of the component images.

The present invention is not limited to the specifically disclosed embodiments, and variations and modifications may be made without departing from the scope of the present invention.

The present application is based on Japanese Priority Application Nos. 2009-063406 filed on Mar. 16, 2009, and 2010-007242 filed on Jan. 15, 2010, the entire contents of which are hereby incorporated herein by reference.

What is claimed is:

1. An information input device comprising:
   a touch panel in which a display screen to display operations information is integrated with a sensor unit, and to which the operations information is input when the display screen is touched with a predetermined unit, the sensor unit including plural sensors to measure a capacitance at a front surface of the display screen, the plural sensors being staggered such that three of the plural sensors adjacent to each other are arranged at positions corresponding to apices of a regular triangle; and
   a position determination unit that determines a position on the display screen touched with the predetermined unit in accordance with levels of capacitances detected with the three adjacent sensors, the levels of capacitances detected being associated with one of a plurality of predefined areas of a region formed by the three adjacent sensors to determine the touched position, each of the predefined areas being defined by respective capacitance detection levels for the three adjacent sensors.

2. The information input device according to claim 1, wherein the position determination unit includes a central position determination unit that determines a center of the three adjacent sensors as the touched position when the levels of capacitances detected with the three adjacent sensors are within a predetermined range.

3. The information input device according to claim 1, wherein the position determination unit includes a first inter-sensor position determination unit that determines the touched position to be between two of the three adjacent sensors in accordance with a comparison result of the levels of the capacitances detected with the three adjacent sensors with each other indicating that the level of the capacitance detected with at least one of the three adjacent sensors is different from the levels of the capacitances detected with the other sensors of the three adjacent sensors.

4. The information input device according to claim 1, wherein the position determination unit includes a second inter-sensor position determination unit that determines, when the levels of the capacitances are detected with two of the three adjacent sensors, the touched position to be between the two adjacent sensors in accordance with a comparison result of the levels of the capacitances detected with the two adjacent sensors with each other.

5. The information input device according to claim 1, wherein the position determination unit includes a directly-above position determination unit that determines, when the level of the capacitance is detected with one of the three adjacent sensors, a position directly above the one sensor as the touched position.

6. The information input device according to claim 1, further comprising:
   an input determination unit that uses as a threshold level the capacitance level detected when an intersection point, at which a median line extending from the position of one of the sensors corresponding to one of the apices of the regular triangle formed by the three adjacent sensors intersects with an opposite side of the regular triangle, is touched, and that determines that the display screen is touched and the operations information is input when the one sensor detects that the level of the capacitance is greater than or equal to the threshold level.

7. The information input device according to claim 6, further comprising:
   a threshold comparison unit that compares the levels of the capacitances detected with the adjacent sensors with the threshold level relative to the one sensor that detects the level of the capacitance greater than or equal to the threshold level.

8. The information input device according to claim 1, further comprising:
   an operations information processing unit that has a storage region to store operating position corresponding information, in which a component image constituting a display of the display screen is associated with position information indicating a position of the component image and operations information input when the component image is specified, and that specifies the position information including the touched position determined by the position determination unit and inputs the operations information associated with the position information by referring to the operating position corresponding information.

9. The information input device according to claim 1, wherein the touch panel includes:
   a switching unit that selectively switches one of the plural sensors to acquire a corresponding capacitance value measured with the one sensor; and
   a conversion unit that converts the capacitance value acquired by the switching unit into a digital value.

10. An image forming apparatus including an information input device to which operations information is input through operations on a touch panel, the information input device comprising:
    a display screen to display operations information integrated with a sensor unit in the touch panel, the sensor unit including plural sensors to measure a capacitance at a front surface of the display screen, the plural sensors being staggered such that three of the plural sensors adjacent to each other are arranged at positions corresponding to apices of a regular triangle; and
    a position determination unit that determines a position on the display screen touched with a predetermined unit in accordance with levels of the capacitances detected with the three adjacent sensors, the levels of capacitances detected being associated with one of a plurality of predefined areas of a region formed by the three adjacent sensors to determine the touched position, each of the predefined areas being defined by respective capacitance detection levels for the three adjacent sensors.

11. A position determination method in which a computer determines an operated position on a touch panel of an information input device including the computer, to which operations information is input through operations on the touch panel, the information input device further including a display screen to display operations information integrated with a sensor unit in the touch panel, the sensor unit including plural sensors to measure a capacitance at a front surface of the display screen, the plural sensors being staggered such that three of the plural sensors adjacent to each other are arranged at positions corresponding to apices of a regular triangle, the method comprising:

determining that the display screen is touched and the operations information is input when one of the sensors detects a level of the capacitance greater than or equal to a threshold level;

comparing the levels of the capacitances detected with two adjacent sensors with the threshold level relative to the one sensor that detects the level of the capacitance greater than or equal to the threshold level; and determining the touched position on the display screen in accordance with the level of the capacitance detected with the one sensor and the levels of the capacitances detected with the two adjacent sensors based on a comparison result in said comparing, the levels of capacitances detected being associated with one of a plurality of predefined areas of a region formed by the three adjacent sensors to determine the touched position, each of the predefined areas being defined by respective capacitance detection levels for the three adjacent sensors.

12. The position determination method according to claim 11, wherein the threshold level is the capacitance level detected when an intersection point, at which a median line extending from the position of the one sensor corresponding to one of the apices of the regular triangle formed by the three adjacent sensors intersects with an opposite side of the regular triangle, is touched.

* * * * *